(12) United States Patent
Abulila et al.

(10) Patent No.: US 11,074,189 B2
(45) Date of Patent: Jul. 27, 2021

(54) FLATFLASH SYSTEM FOR BYTE GRANULARITY ACCESSIBILITY OF MEMORY IN A UNIFIED MEMORY-STORAGE HIERARCHY

(71) Applicants: INTERNATIONAL BUSINESS MACHINES CORPORATION, Armonk, NY (US); UNIVERSITY OF ILLINOIS AT URBANA-CHAMPAIGN, Urbana, IL (US)

(72) Inventors: Ahmed Abulila, Urbana, IL (US); Vikram Sharma Mailthody, Urbana, IL (US); Zaid Qureshi, Bronx, NY (US); Jian Huang, Champaign, IL (US); Nam Sung Kim, Champaign, IL (US); Jinjun Xiong, Goldens Bridge, NY (US); Wen-Mei Hwu, Urbana, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 16/447,914

(22) Filed: Jun. 20, 2019

(65) Prior Publication Data
US 2020/0401530 A1 Dec. 24, 2020

(51) Int. Cl.
*G06F 12/0893* (2016.01)
*G06F 12/123* (2016.01)
*G06F 12/1045* (2016.01)

(52) U.S. Cl.
CPC ...... *G06F 12/0893* (2013.01); *G06F 12/1045* (2013.01); *G06F 12/124* (2013.01);
(Continued)

(58) Field of Classification Search
CPC ....... G06F 2212/1021; G06F 2212/608; G06F 12/0897; G06F 12/0893; G06F 2212/601;
(Continued)

(56) References Cited

U.S. PATENT DOCUMENTS

| 5,745,673 A | 4/1998 | Zenzo et al. |
| 2014/0006659 A1* | 1/2014 | Foong ................... G06F 12/063 710/74 |

(Continued)

FOREIGN PATENT DOCUMENTS

CN 102760101 A 3/2015

OTHER PUBLICATIONS

Wang, C., Vazhkudai, S. S., Ma, X. et al. (2012). NVMalloc: Exposing an aggregate SSD store as a memory partition in extreme-scale machines. 2012 IEEE 26th International Parallel and Distributed Processing Symposium, pp. 957-968.
(Continued)

*Primary Examiner* — Zhou H Li
(74) *Attorney, Agent, or Firm* — Griffiths & Seaton PLLC

(57) ABSTRACT

Various embodiments are provided for providing byte granularity accessibility of memory in a unified memory-storage hierarchy in a computing system by a processor. A location of one or more secondary memory medium pages in a secondary memory medium may be mapped into an address space of a primary memory medium to extend a memory-storage hierarchy of the secondary memory medium. The one or more secondary memory medium pages may be promoted from the secondary memory medium to the primary memory medium. The primary memory medium functions as a cache to provide byte level accessibility to the one or more primary memory medium pages. A memory request for the secondary memory medium page may be redirected using a promotion look-aside buffer ("PLB") in a host bridge
(Continued)

associated with the primary memory medium and the secondary memory medium.

20 Claims, 16 Drawing Sheets

(52) U.S. Cl.
CPC ............ *G06F 2212/1021* (2013.01); *G06F 2212/225* (2013.01); *G06F 2212/601* (2013.01); *G06F 2212/608* (2013.01)

(58) Field of Classification Search
CPC .............. G06F 12/1045; G06F 12/124; G06F 2212/225
See application file for complete search history.

(56) References Cited

U.S. PATENT DOCUMENTS

| | | |
|---|---|---|
| 2015/0261446 A1 | 9/2015 | Lee |
| 2016/0110128 A1 | 4/2016 | Tomlin et al. |
| 2017/0102873 A1 | 4/2017 | Hanson et al. |
| 2018/0018171 A1 | 1/2018 | Amidi et al. |
| 2018/0365167 A1* | 12/2018 | Eckert ................ G06F 12/1027 |
| 2019/0042145 A1* | 2/2019 | Pham ................ G06F 12/0862 |
| 2019/0042460 A1* | 2/2019 | Trika ................ G06F 12/0246 |
| 2019/0179764 A1* | 6/2019 | Wang ................ G06F 12/0893 |

OTHER PUBLICATIONS

Jin, Y., Tseng, H. W., Papakonstantinou, Y. et al. (2017). KAML: A flexible, high-performance key-value SSD. 2017 IEEE International Symposium on High Performance Computer Architecture (HPCA), pp. 373-384.

* cited by examiner

FLATFLASH SYSTEM FOR BYTE GRANULARITY ACCESSIBILITY OF MEMORY IN A UNIFIED MEMORY-STORAGE HIERARCHY

BACKGROUND OF THE INVENTION

Field of the Invention

The present invention relates in general to computing systems, and more particularly to, various embodiments for implementing a FlatFlash system for byte granularity accessibility of memory in a unified memory-storage hierarchy using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and/or retrieving various amounts of information is a key problem to solve.

SUMMARY OF THE INVENTION

Various embodiments are illustrated for implementing a FlatFlash system for byte granularity accessibility of memory in a unified memory-storage hierarchy in a computing system by a processor. A location of one or more secondary memory medium pages in a secondary memory medium may be mapped into an address space of a primary memory medium to extend a memory-storage hierarchy of the secondary memory medium. The one or more secondary memory medium pages may be promoted from the secondary memory medium to the primary memory medium. The primary memory medium functions as a cache to provide byte level accessibility to the one or more primary memory medium pages. A memory request for the secondary memory medium page may be redirected using a promotion look-aside buffer ("PLB") in a host bridge associated with the primary memory medium and the secondary memory medium.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
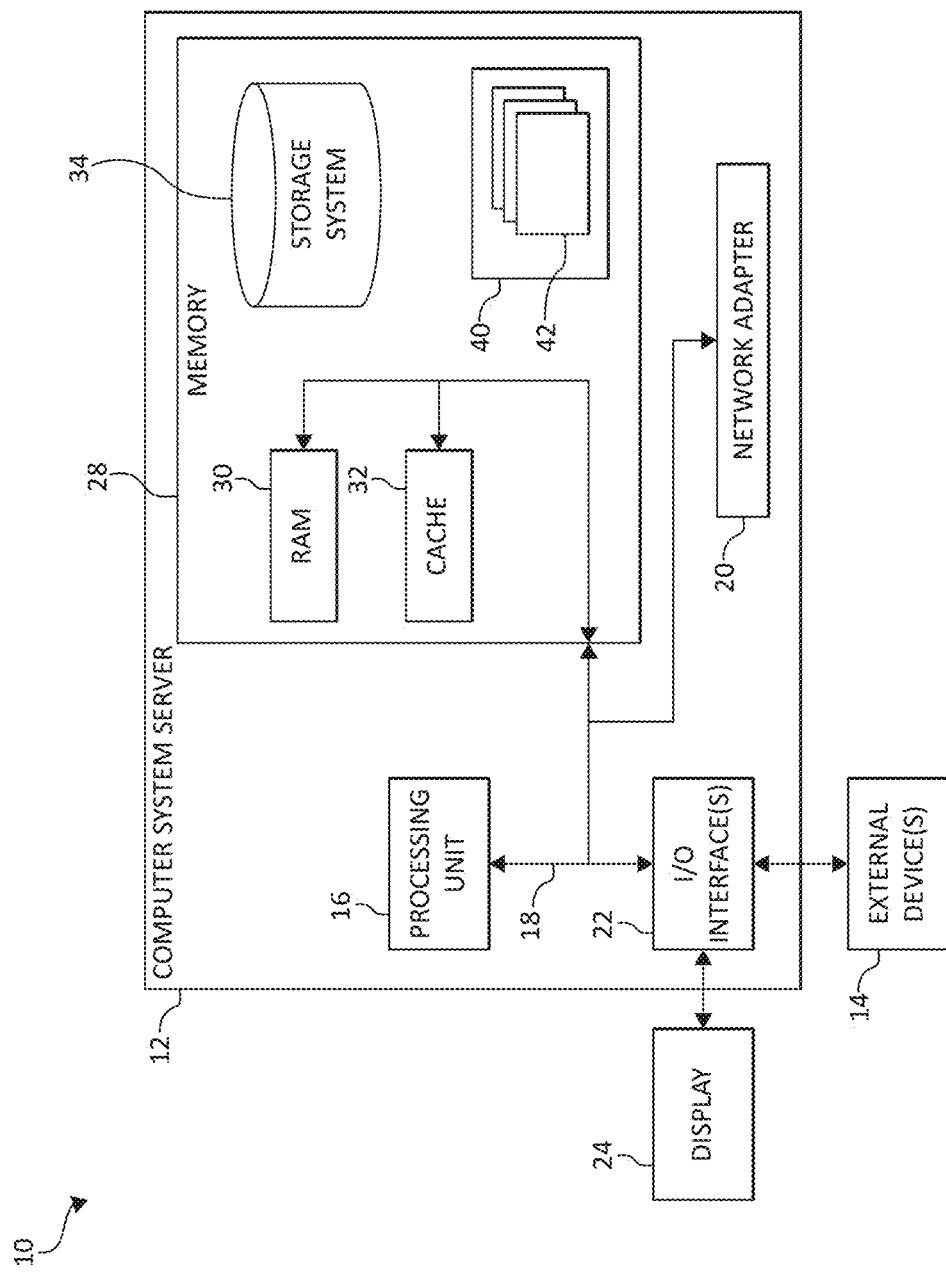
FIG. 1 is a block diagram depicting an exemplary cloud computing node according to an embodiment of the present invention.

Using flash-based solid state drives (SSDs) as main memory may be used towards scaling and expanding memory capacity for data-intensive applications. For example, an SSD may scale up to terabytes per peripheral component interconnect express ("PCIe") slot. However, a dynamic random-access memory ("DRAM") scales only to gigabytes per dual in-line memory module ("DIMM") slot. To overcome the DRAM scaling issue, current approaches leverage the memory mapped interface and paging mechanism in operating systems and treat SSDs as fast backing storage for the DRAM. Said differently, the current approaches rely on a paging mechanism to move data between SSDs and a host DRAM.

Although current approaches simplify the development, they suffer from three drawbacks. First, the paging mechanism incurs performance overhead. For each memory access to data that is not present in DRAM, a page fault is triggered and a software page handler moves the accessed page from SSD to main memory, resulting in an execution delay. Second, the paging mechanism faces the thrashing problem caused by data-intensive applications whose working set sizes are significantly larger than the available DRAM capacity. Third, the byte granularity of data access incurs a tremendous amount of extra I/O traffic by moving the whole page even if a small portion within that page is needed, which not only affects SSD performance but also hurts the SSD lifetime.

Thanks to the byte-addressability supported by the PCIe interconnect and the internal memory in SSD controllers, it is feasible to access SSDs in both byte and block granularity (e.g., leveraging an available Base Address Registers "BARs") in the SSD controller through the PCIe memory-mapped I/O interface (MMIO). Exploiting the benefits of SSD's byte-accessibility in today's memory-storage hierarchy is, however, challenging as it lacks systems support and abstractions for programs.

Accordingly, various embodiments are provided herein to provide a unified memory-storage system for providing byte granularity accessibility of memory in a computing system by a processor. A location of one or more secondary memory medium pages in a secondary memory medium (e.g., a SSD) may be mapped into an address space of a primary memory medium (e.g., a DRAM) to extend a memory-storage hierarchy of the secondary memory medium. The one or more secondary memory medium pages may be promoted from the secondary memory medium to the primary memory medium. The primary memory medium functions as a cache to provide byte level accessibility to the one or more primary memory medium pages. A memory request for the secondary memory medium page may be redirected using a promotion look-aside buffer ("PLB") in a host bridge associated with the primary memory medium and the secondary memory medium.

In one aspect, a FlatFlash architecture is an optimized unified memory-storage hierarchy, to efficiently use byte-addressable SSD as part of the main memory. A virtual memory management may be extended to provide a unified memory interface so that one or more application may seamlessly access data across SSD and DRAM in byte granularity. In one aspect, the present invention provides for first mapping one or more SSD page locations into the memory host address space and extend virtual memory management to make use of the physical pages across the byte-addressable SSD and host DRAM. A DRAM present in the SSD controller may be used as a cache for accessed pages. Thus, the host CPU can issue memory requests (load/store) to a unified memory space, which eases the programmability and management of byte-addressable SSDs and makes programs access data across SSD and host DRAM seamlessly.

A lightweight, adaptive page promotion mechanism between an SSD and a DRAM may be used, implemented, and/or activated to achieve/gain benefits from both a byte-addressable large SSD and fast DRAM concurrently and transparently, while avoiding unnecessary page movements. In an additional aspect, the present invention provides an abstraction of byte-granular data persistence to exploit the persistence nature of SSDs, upon to reduce the crash consistency of several representative application/computing systems that require data persistence such as, for example, a file systems and transactional database.

In one aspect, one or more hot pages (e.g., frequently used as compared to other pages that are less frequently used) may be promoted concurrently to the host DRAM for fast access while keeping cold pages (e.g., less frequently used pages as compared to the hot pages) in the SSD for direct, byte-granular access to avoid thrashing. To avoid application stalls caused by the page promotion, a promotion look-aside buffer (PLB) may be used, added, initiated, and/or activated in a host bridge for redirecting memory requests for a page being promoted to its current physical address. In one aspect, the PLB is restricted from other activities and is exclusively used for pages being promoted. Furthermore, to preserve the persistent nature of SSDs in the unified memory-storage hierarchy, the present invention provides for byte-granular data persistence to exploit the fine-grained durable write with a battery-backed DRAM in SSDs. Unlike persistent storage that uses a block interface, the present invention enables the feature of byte-granular data persistence of the SSD and reduces the crash consistency overhead for application/computing systems that have strict requirement on data persistence.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
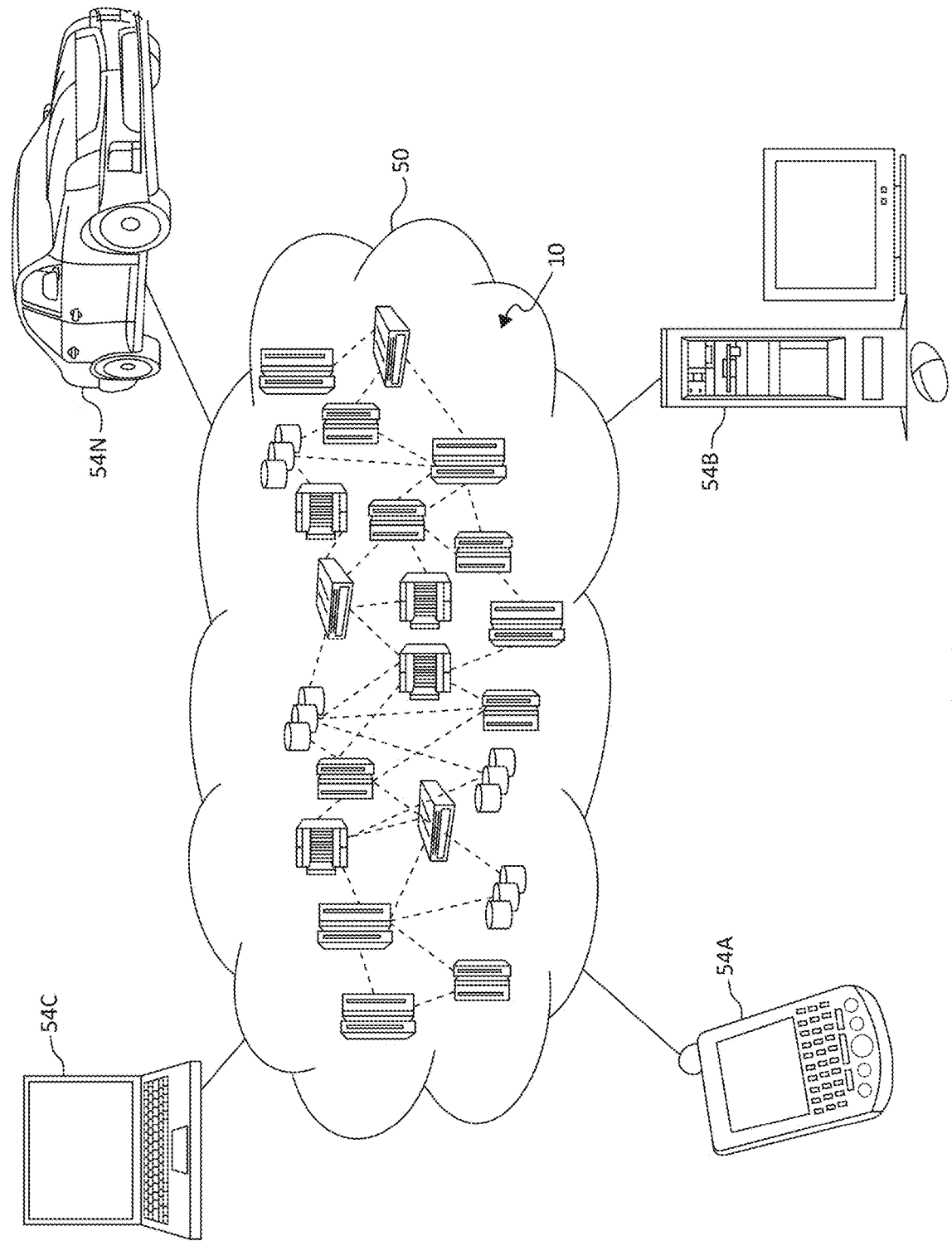
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
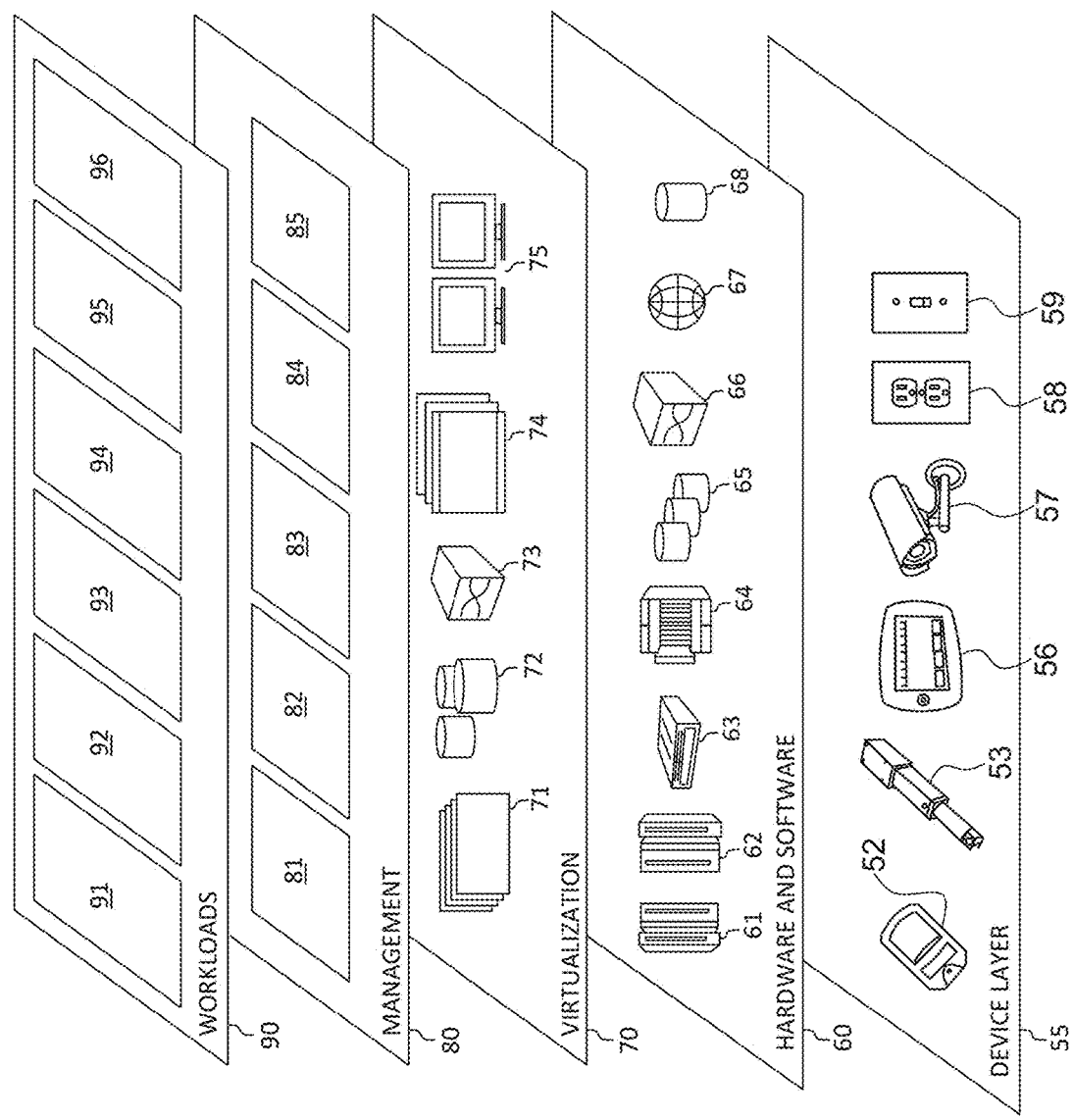
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for exploiting byte granularity accessibility of memory in a unified memory-storage hierarchy in a computing environment. In addition, workloads and functions 96 for exploiting byte granularity accessibility of memory in a unified memory-storage hierarchy in a computing environment may include such operations as data analysis (including data collection and processing from various environmental sensors) and/or analytics operations. One of ordinary skill in the art will appreciate that the workloads and functions 96 for exploiting byte granularity accessibility of memory in a unified memory-storage hierarchy in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for implementing a FlatFlash system for exploiting byte granularity accessibility of memory in a unified memory-storage hierarchy in a computing environment. The mechanisms of the illustrated embodiments provide for FlatFlash, which is a unified memory and storage architecture with byte-addressable secondary memory mediums (e.g., SSDs) and primary memory mediums (e.g., DRAM). The present invention provides a unified memory interface to enhance management and programmability of the dual byte and block-accessible interfaces of secondary memory mediums (e.g., SSDs). An adaptive page promotion scheme is provided to enable one or more applications use both byte-addressable secondary memory mediums (e.g., SSDs) and primary memory mediums (e.g., DRAM) simultaneously while incurring negligible performance and storage overhead.

Figure 4:
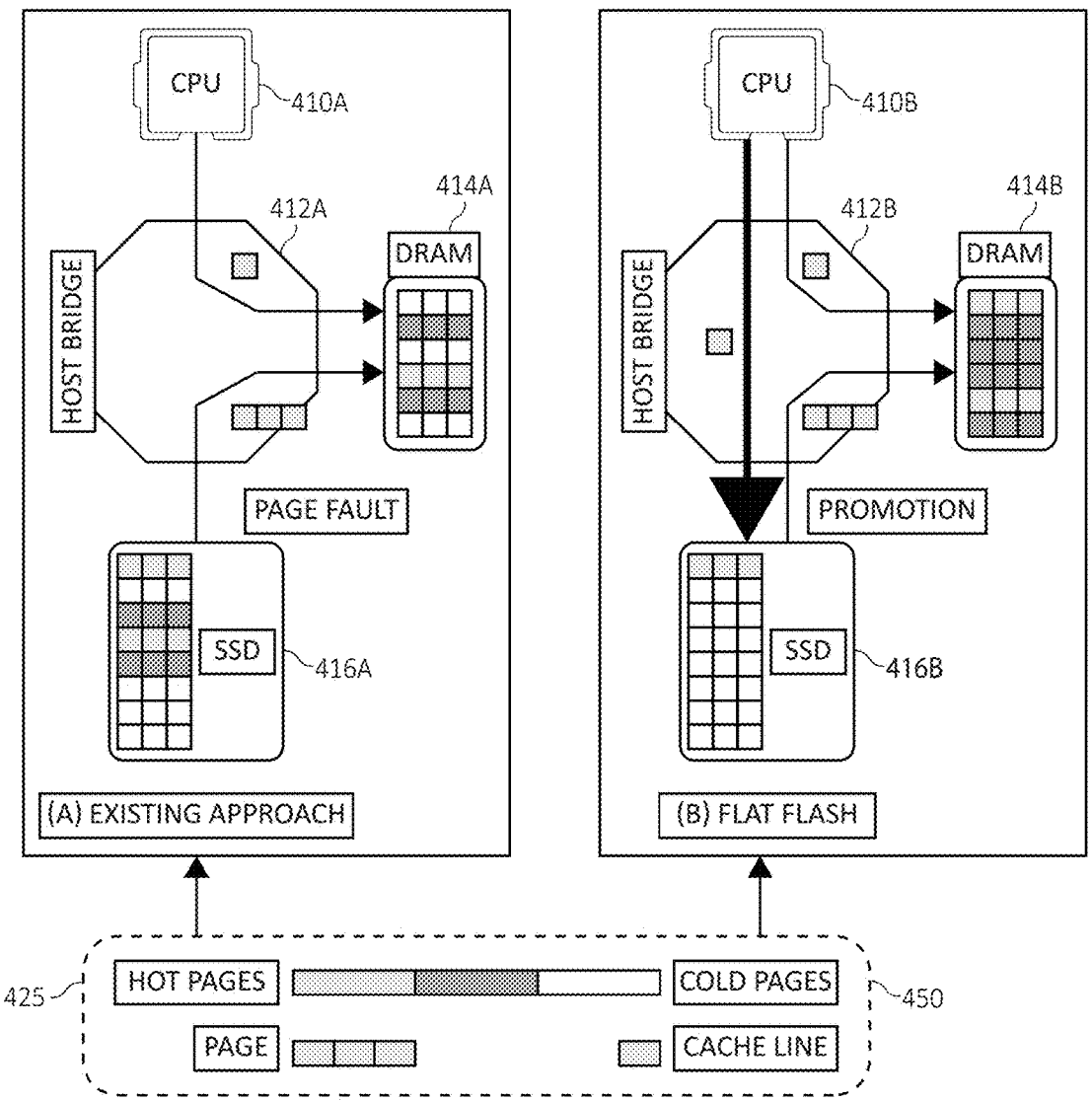
FIG. 4 is an additional block diagram depicting comparison between the current state of the art relying on page mechanisms to migrate pages and FlatFlash providing direct memory access to a solid state drive ("SSD") with adaptive page promotion for hot pages in which aspects of the present invention may be realized.

FIG. 4 is an additional block diagram 400 depicting comparison between the current state of the art relying on page mechanisms to migrate pages and FlatFlash providing direct memory access to a SSD with adaptive page promotion for hot pages. That is, block diagrams of computing system 425 and computing system 450 depicts a central processor unit ("CPU") 410A and 410B, a host bridge 412A and 412B, a secondary memory medium 416A and 416B (e.g., an SSD), and a primary memory medium 414A and 414B (e.g., DRAM). In one aspect, one or more of the components, modules, services, applications, and/or functions described in FIGS. 1-3 may be used in FIG. 4.

In computing system 425, the secondary memory medium 416A (e.g., SSD) is used as extended memory (i.e., unified memory-storage hierarchy) but does so by only relying on paging mechanism to manage the secondary memory medium 416A (e.g., SSD). Applications running on the CPU 410A are allowed to access the primary memory medium 414A (e.g., DRAM) in cache line granularity. However, a page fault occurs whenever an application accesses data in the extended memory region backed by the secondary memory medium 416A (e.g., SSD). The application is stalled until the operating software ("OS's") page fault handler migrates the requested page from the secondary memory medium 416A (e.g., SSD) to the primary memory medium 414A (e.g., DRAM) and updates the page table. For applications with large datasets that cannot fit in the primary memory medium 414A (e.g., DRAM), a significant number of page faults are triggered and pages are frequently swapped between the primary memory medium 414A (e.g., DRAM) and the secondary memory medium 416A (e.g., SSD). For workloads with random page access patterns to a large data set, the traffic between the secondary memory medium 416A (e.g., SSD) and primary memory medium 414A (e.g., DRAM) is increased drastically due to the thrashing, a phenomenon where pages brought into DRAM are simply replaced before they can be accessed again.

Byte Vs. Block-Accessible Interface for Primary Memory Mediums

Turning now to computing system 450, the cost of page migration is exacerbated for workloads accessing only a few bytes or cache lines of a page, as any access to a page in a secondary memory medium 416B requires migration of the whole page between the secondary memory medium 416B (e.g., SSD) and primary memory medium 414B (e.g., DRAM) in the memory-storage hierarchy. Being able to issue memory requests (i.e., load/store) directly to the secondary memory medium 416B (e.g., SSD) eliminates the need to migrate pages between the secondary memory medium 416B (e.g., SSD) and primary memory medium 414B (e.g., DRAM). Using one or more current interface standards such as, for example, PCIe, the CPU 410B may issue load/store accesses, including atomic operations, directly to the secondary memory medium 416B (e.g., SSD) using memory-mapped I/O. However, to enable the secondary memory medium 416B (e.g., SSD) to become byte-addressable, the primary memory medium 414B (e.g., DRAM) that may be present inside the secondary memory medium 416B (e.g., SSD) may be used (which originally were used for the purpose of storing a flash translation layer (FTL) and data buffering) to service the CPU 410B memory requests. With the byte-addressable secondary memory medium 416B (e.g., SSD) memory extension, applications with a random access pattern can issue memory requests directly to the secondary memory medium 416B (e.g., SSD) in cache line granularity, thus reducing the I/O traffic.

For an application that exhibits data locality, computer system 450 may still promote its working set into the primary memory medium 414B (e.g., DRAM) and exploit the fast the primary memory medium 414B (e.g., DRAM) for increased performance. In short, computer system 450 provides a FlatFlash architecture by providing byte granularity accessibility of memory in a unified memory-storage hierarchy. A location of a primary memory medium page (e.g., a hot page) in the secondary memory medium 416B (e.g., SSD) may be mapped into an address space of a primary memory medium 414B (e.g., DRAM) to extend a memory-storage hierarchy of the primary memory medium 414B (e.g., DRAM). One or more primary memory medium pages (e.g., hot pages) may be promoted from the secondary memory medium 416B (e.g., SSD) to the primary memory medium 414B (e.g., DRAM). The primary memory medium 414B (e.g., DRAM) functions as a cache to provide byte level accessibility to the one or more primary memory medium pages (e.g., hot pages). A memory request for the secondary memory medium page may be redirected using a promotion look-aside buffer ("PLB") (see FIG. 5) in a host bridge 412B associated with the secondary memory medium 416B (e.g., SSD) and the primary memory medium 414B (e.g., DRAM).

Figure 5:
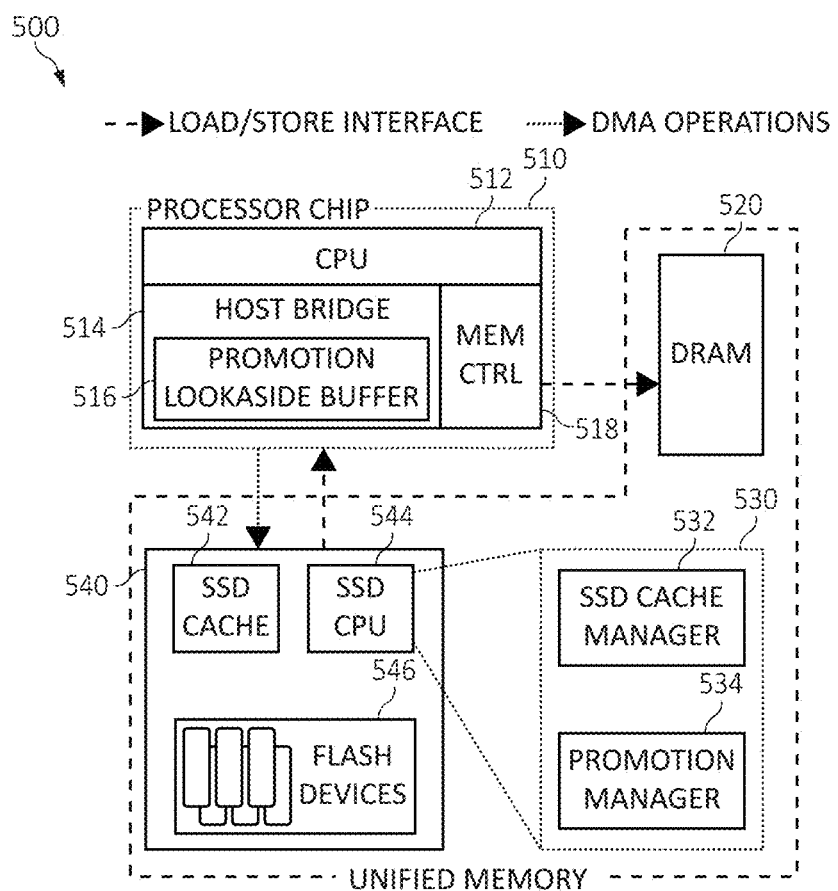
FIG. 5 is an additional block diagram depicting various user hardware and computing components functioning in accordance with aspects of the present invention.

Turning now to FIG. 5, various user hardware and computing components functioning in a FlatFlash system 500 is depicted. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity. In one aspect, as described herein, the FlatFlash system 500 manages and exploits the byte-addressable primary memory medium (e.g., SSD).

As illustrated, by way of example only, the FlatFlash system 500 may include a processor device 510 ("processor chip") and a unified memory system 530, which may be in communication with each other. The processor device 510 may include a CPU 512, a host bridge 514, a promotion lookaside buffer ("PLB") 516, and a memory controller 518.

The unified memory system 530 may include a secondary memory medium 540 (e.g., an SSD) and a primary memory medium 520 (e.g., DRAM). The secondary memory medium 540 may include a cache 542 (e.g., SSD cache), a primary memory CPU 544 (e.g., an SSD CPU), and/or one or flash devices 546. The primary memory CPU 544 may include a cache manager 532 (e.g., an SSD cache manager) and a promotion manager 534.

The FlatFlash system 500 addresses the challenges associated with exploiting the byte-accessibility of secondary memory medium 540 (e.g., an SSD) in five steps. First, one or more operations may be used to enable byte-accessibility of secondary memory medium 540 (e.g., an SSD) in the FlatFlash system 500. Second, the FlatFlash system 500 may combine the secondary memory medium 540 (e.g., an SSD) and primary memory medium 520 (e.g., DRAM) into a unified and flat memory space (e.g., the unified memory system 530). That is, a virtual memory page can be mapped either to the secondary memory medium 540 (e.g., an SSD) and/or primary memory medium 520 (e.g., DRAM). Such a unified memory interface simplifies the programmability of byte-addressable secondary memory medium 540 (e.g., an SSD). Thus, one or more applications can directly access the secondary memory medium 540 (e.g., an SSD) using memory requests without the need of paging mechanism.

Third, to gain benefits from the faster accesses to the primary memory medium 520 (e.g., DRAM), the FlatFlash system 500 promotes pages from the secondary memory medium 540 (e.g., an SSD) to the host primary memory medium 520 (e.g., DRAM). The FlatFlash system 500 keeps the page promotion activities from stalling application execution and ensures data consistency during the promotion process. Fourth, to further bring benefits for applications, the FlatFlash system 500 implements and uses an adaptive promotion policy that is dependent on their access patterns. The adaptive promotion mechanism (e.g., the promotion manager 534) may communicate and interacts with the SSD-Cache 542 to determine which pages to promote. Fifth, the FlatFlash system 500 enables byte-granular data persistence which facilitates critical-data persistence for systems software and applications that have strict requirement on data persistence.

It should be noted that to facilitate effective page promotion and ensure data consistency during the promotion procedure, the PLB 516 may be added, initiated, and/or activated to the host bridge 514 (a.k.a., Root Complex) that connects the CPU 512, memory controller 518, and one or more I/O interfaces such as, for example, interfaces with the unified memory system 530.

Thus, the FlatFlash system 500 only requires a hardware modification to the host bridge 512 by introducing the PLB (e.g., 1.6 KB "Kilobyte") for enabling concurrent page promotions and data consistency.

Enabling Byte-Addressability of Primary Memory Medium (e.g., SSD)

The PCIe standard defines a set of Base Address Registers (BARs) (which are available in the PCIe) for end-point devices (e.g., secondary memory medium 540 such as, for example SSDs) to advertise a memory mappable region to the host at the system reset stage. During boot time, a BIOS and OS check the BAR registers of the PCIe-based endpoint devices (e.g., secondary memory medium 540 such as, for example SSDs) to add the extended memory mapped regions to the host primary memory medium 520 (e.g., DRAM).

The memory requests to these extended memory-mapped regions may be redirected to the respective PCIe end-point devices (e.g., secondary memory medium 540 such as, for example SSDs) by the host bridge 514. The end-point device such as, for example, the secondary memory medium 540 (e.g., an SSD) may be responsible for mapping internal resources to the respective address ranges. With a PCIe MMIO, the memory requests including atomic reads and writes, can be directly issued to the PCIe end-point device such as, for example, the secondary memory medium 540 (e.g., an SSD).

In one aspect, the FlatFlash system 500 exploits one of the PCIe BARs to expose the flash memory in the secondary memory medium 540 (e.g., an SSD) as a byte-addressable memory mapped region to the host primary memory medium 520 (e.g., DRAM). During PCIe enumeration, the flash memory region (e.g., unified memory) is mapped into the memory space in the host primary memory medium 520 (e.g., DRAM).

Since the host PCIe bridge does not support cache coherence between a host machine and PCIe devices, the PCIe MMIO accesses are not cached in the host processor cache (e.g., inside CPU 512 of FIG. 5), which would miss the chance of exploiting the performance benefit of processor cache for applications.

In one aspect, the FlatFlash system 500 may leverage a cache coherent protocol in CAPI to enable cache-able memory accesses in the FlatFlash system 500. Although PCIe MMIO supports memory requests in byte granularity, the secondary memory medium 540 (e.g., NAND flash memory chips in an SSD) have to be accessed in byte granularity. To fill this gap, the FlatFlash system 500 leverages the host primary memory medium 520 (e.g., DRAM), which is normally used for flash translation layer (FTL) but no longer needed since the FTL has been merged with the page table in the host primary memory medium 520 (e.g., DRAM) inside the secondary memory medium 540 (e.g., SSD) as a cache (e.g., SSD-Cache 542) for the memory-mapped flash memory region. Therefore, SSD-Cache 542 provides a bridge between the byte-addressable interface such as, for example, host bridge 514 and the secondary memory medium 540 (e.g., NAND Flash chips in and SSD). The SSD cache manager 532 is responsible for handling all the operations related to SSD cache 542. It should be noted that in one aspect, the SSD cache 542 is organized in byte granularity.

To further illustrate, the FlatFlash system 500 handles and process each memory requests to the memory-mapped secondary memory medium 540 (e.g., SSD) as follows.

For a memory read request, the SSD cache manager 532, in a controller in the secondary memory medium 540 (e.g., SSD), serves the memory read request by searching the SSD cache 542 with a selected physical address. For an SSD cache 542 hit, the FlatFlash system 500 issues a PCIe MMIO response to the host primary memory medium 520 (e.g., DRAM) with the data. If it is a cache miss, the FlatFlash system 500 reads the page from one or more flash devices 546 with the physical address. The SSD cache manager 532 then issues a PCIe MMIO response with a requested cache line from the page.

For a memory write request, if there is a SSD cache 542 hit, the SSD cache manager 532 updates the page in the SSD cache 542 with the new data. If there is a cache miss, the FlatFlash system 500 loads the page from one or more flash devices 546 with the physical address into the SSD cache 542 and updates the SSD cache 542 with the new data.

The FlatFlash relies on the garbage collection (GC) of the secondary memory medium 540 (e.g., SSD) to collect dirty pages in SSD cache 542 and periodically write them back to the secondary memory medium 540 (e.g., SSD). Since accesses to the secondary memory medium 540 (e.g., SSD) is slower than accesses to the host primary memory medium 520 (e.g., DRAM), pages that are frequently accessed (i.e., hot pages) can be promoted to the host primary memory medium 520 (e.g., DRAM) for increased/better computing efficiency and performance.

Unified Memory with Byte-Addressable Primary Memory Medium (e.g., SSD)

Figure 6:
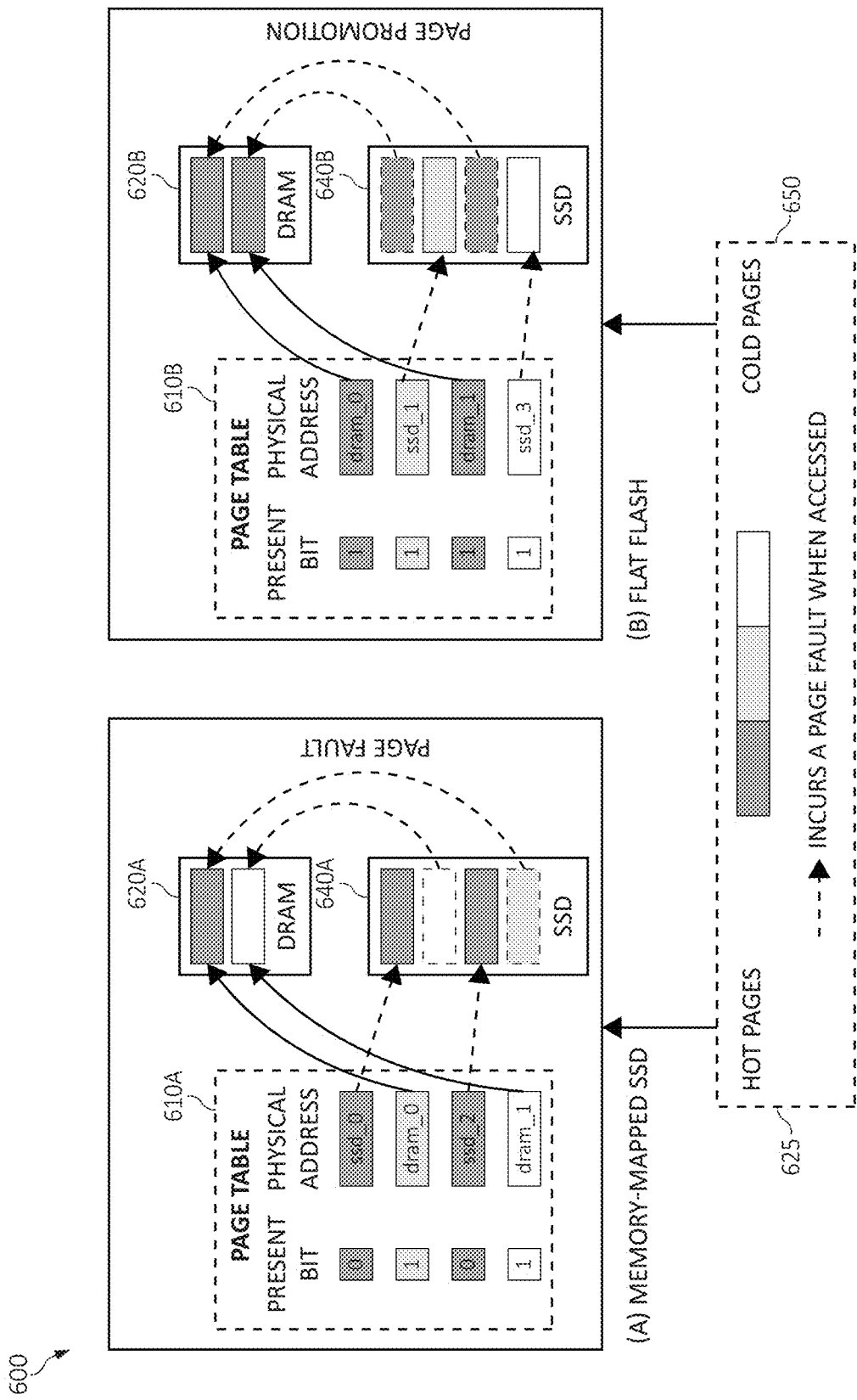
FIG. 6 is an additional block diagram depicting comparison between the current state of the art for page table support for memory-mapped solid state drive ("SSD") and FlatFlash architecture for page table support in which aspects of the present invention may be realized.

Turning now to FIG. 6, diagram 600 depicts comparison between current state of the art page table support for memory-mapped solid state drive ("SSD") in computing system 625 and FlatFlash system 650 for page table support. In one aspect, one or more of the components, modules, services, applications, and/or functions described in FIGS. 1-5 may be used in FIG. 6. Repetitive description of like elements, components, modules, services, applications, and/or functions employed in other embodiments described herein is omitted for sake of brevity.

In one aspect, as described herein, the computing system 625 includes a page table 610A, a primary memory medium 620A (e.g., DRAM), and a secondary memory medium 640A (e.g., an SSD). The FlatFlash system 650 includes a page table 610B, a primary memory medium 620B (e.g., DRAM), and a secondary memory medium 640B (e.g., an SSD). The FlatFlash system 650 manages and exploits the byte-addressable secondary memory medium 640B (e.g., SSD).

In one aspect, the secondary memory medium 640B (e.g., an SSD) of the FlatFlash system 650 may be used as memory via the memory-mapped interface provided by operating systems. In the traditional such as, for example computer system 625, the entries of the page table 610 A point to the physical DRAM addresses in the primary memory medium 620B (e.g., DRAM) such as, for example, DRAM_0 points to the primary memory medium 620B (e.g., DRAM). For an access to a page in the secondary memory medium 640B (e.g., an SSD), a page fault will occur, resulting in the page migration from the secondary memory medium 640B (e.g., an SSD) to the primary memory medium 620B (e.g., DRAM).

However, a unified address translation may be used for memory-mapped the secondary memory medium 640B (e.g., an SSD) by a memory, storage, and device-level address translation (i.e., flash translation layer) into page tables 610B such as, for example, in a virtual memory system. Therefore, the page table 610B entries can point to a physical addresses in the secondary memory medium 640B (e.g., an SSD).

The FlatFlash system 650 may still rely on paging mechanism to use the primary memory medium 620B (e.g., DRAM) as the cache when applications access the memory-mapped secondary memory medium 640B (e.g., an SSD). Also, the FlatFlash 650 does not require a page to be moved to the host primary memory medium 620B (e.g., DRAM) before it can be accessed through the memory interface. The FlatFlash 650 provides direct cache line access to the memory-mapped secondary memory medium 640B (e.g., an SSD). The FlatFlash 650 leverages the unified address translation operation to reduce the address translation overhead and enables applications to issue memory requests directly to each of the pages in the SSD. This removes the need for the paging mechanism for a regular memory access to the memory-mapped secondary memory medium 640B (e.g., an SSD).

At this point, it should be noted that promoting a page from memory-mapped secondary memory medium 640B (e.g., an SSD) to the host primary memory medium 650B (e.g., DRAM) is not free (e.g., a computer resource cost). Also, a write request to the page that is being promoted would result in inconsistent view of the data to the application. To overcome these challenges, the FlatFlash 650 performs off-critical path page promotion to avoid application stall.

Off-Critical Path Page Promotion

Figure 7:
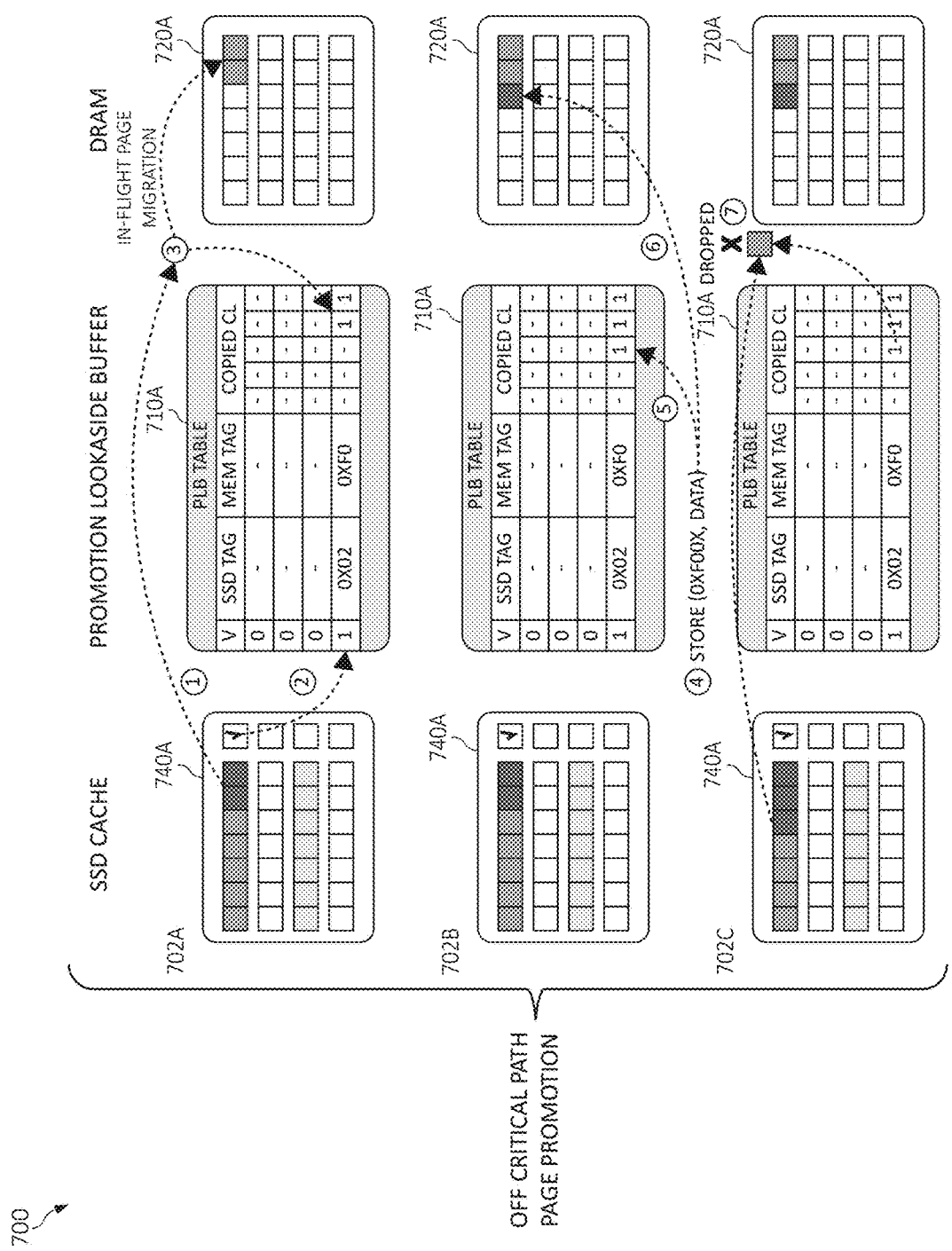
FIG. 7 is an additional block diagram depicting various user hardware and computing components for using a promotion look-aside buffer ("PLB") in accordance with aspects of the present invention.

As previously stated, to facilitate effective page promotion and ensure data consistency during the promotion procedure, as illustrated in FIG. 7 incorporating one or more components of FIGS. 5 and 6, a Promotion Look-aside Buffer ("PLB") such as, for example, the PLB 710A in communication with an primary cache 740A (e.g., SSD cache 740A) and a primary memory medium 720A (e.g., DRAM) (see also PLB 516 of FIG. 5 that may be added, initiated, and/or activated to the host bridge that connects the CPU 512, memory controller 518, and I/O interfaces). It should be noted that the page promotion is executed in cache line granularity and concurrent promotions for multiple cache lines are enabled. The PLB 710A may include a PLB table and a controller to manage any memory requests to the in-flight promotion page.

As illustrated in 702A of FIG. 7, each in-flight page promotion has an entry in the PLB table of the PLB 710A with its source primary memory medium (e.g., SSD) physical address ("SSD tag") and its destination secondary memory medium (e.g., a DRAM) physical address ("Mem tag"). The PLB 710A entry also has a valid bit ("V") and a bit vector ("copied Cache Line") to indicate if each cache line ("CL") in the page is currently residing in the host primary memory medium 720A (e.g., DRAM) or not (which may be in the secondary memory medium 740A (e.g., SSD which may include a SSD cache)). When a page promotion is requested by the promotion manager, the PLB 710A will receive a free page from a reserved memory region in the host primary memory medium 720A (e.g., DRAM) for caching the page being promoted and initialize a PLB 710A entry with the secondary memory medium (e.g., SSD) and primary memory medium 720A (e.g., DRAM) addresses. The PLB 710A uses the copied CL field to ensure the data consistency between the secondary memory medium 740A (e.g., SSD) and the host primary memory medium 720A (e.g., DRAM).

During the page promotion, for each cache line that is promoted from the secondary memory medium 740A (e.g., SSD) to the host primary memory medium 720A (e.g., DRAM), the PLB 710A (e.g., a PLB controller) checks if the corresponding bit in copied CL field is or is not set. If the corresponding bit in copied CL field has been set by an evicted cache line from the CPU (see CPU 512 of FIG. 5) during the promotion, PLB 710A (e.g., a PLB controller) may cancel the promotion of that cache line from the secondary memory medium 740A (e.g., SSD). Otherwise, the PLB 710A (e.g., a PLB controller) first sets the corresponding bit in the copied CL field to inform that the most recent copy of that cache line exists in the host primary memory medium 720A (e.g., DRAM) and then all the memory operations to this cache line will be forwarded to the host primary memory medium 720A (e.g., DRAM).

When PLB 710A receives requests to the same cache line from both the host CPU (e.g., CPU 512 of FIG. 5) (for regular memory operations) and the secondary memory medium 740A (e.g., a SSD controller of the SSD) (for page promotion), the PLB 710A gives higher priority to the requests from host CPU (e.g., CPU 512 of FIG. 5) to avoid conflicts. In the FlatFlash system such as, for example, FlatFlash system 500, the PLB table of the PLB 710A may have 64 entries. Each entry may have 24 bytes (8 bytes for each tag) and one ("1") valid bit. Thus, its storage overhead is trivial.

Once the promotion of a page is completed, its corresponding entry in the PLB table of the PLB 710A may be cleaned/erased for future use. As the FlatFlash system such as, for example, the FlatFlash system 500 indexes the PLB entries in the PLB 710A following the principles of the content-addressable memory ("CAM") design, each PLB entry in the PLB 710A lookup takes only one CPU cycle, thus its performance overhead is negligible.

Since the PLB 710A has multiple entries, it enables concurrent promotion of multiple hot pages. As host primary memory medium 720A (e.g., DRAM) capacity is limited, the least-recently used ("LRU") pages will be evicted out for free space in host primary memory medium 720A (e.g., DRAM) and written back to the secondary memory medium 740A (e.g., SSD) with byte granularity, and the corresponding TLB entries will be updated to the flash addresses.

Since the latency of writing a page to the secondary memory medium 740A (e.g., SSD) is much higher (e.g., 16 μs "microseconds) for ultra-low latency Z-SSD) than the latency of TLB shootdown (e.g., invalidate cache entries in the TLB), the TLB shootdown overhead is relatively small and has negligible effect.

To further demonstrate the in-flight page promotion process, consider the following example, in FIG. 7. In step 1 of block 702A, a hot page is identified for promotion. The promotion manager 534 initiates the promotion by informing the PLB 710A (e.g., the PLB is a table for tracking page promotion status) with the source and destination physical addresses. The PLB 710A then inserts a valid entry to the PLB table of PLB 710A, as in step 2 of block 702A. For each CL that is promoted, the PLB 710A (e.g., a PLB controller) sets the corresponding bit in the Copied CL field, as in step 3 of block 702A.

In block 702b, depicts a store (cache eviction from CPU processor cache) to a CL within the in-flight page promotion, as in step 4. That is, when the page is being promoted to the primary memory medium 720A (e.g., DRAM), its cached data may be updated in processor cache and being evicted from processor cache so as to ensure the data consistency by setting the PLB entries. The PLB 710A (e.g., a PLB controller) may set the copied CL field, as in step 5, in the PLB 710A entry and redirects the CL to the host primary memory medium 720A (e.g., DRAM) using the Mem Tag field, as in step 6 of block 710B. As for the promotion of an inbound CL from the SSD promotion manager, the PLB 710A (e.g., a PLB controller) checks the copied CL flag to determine if the CL is updated.

As shown in block 702C of FIG. 7, if the copied CL is set, it means the most recent copy of the corresponding CL is in the host primary memory medium 720A (e.g., DRAM), the inbound CL from the secondary memory medium 740A (e.g., SSD) may be discarded, as in step 7 of block 702C.

In summary, as depicted in block 702A-C, for each promotion, the FlatFlash system 500 may promote an entire flash page but it promotes the flash page at the cache-line granularity. When a flash page is promoted, an entry is inserted into the PLB table of the PLB 710A, the valid bit (V) is set to 1, the copied cache lines are set to 1 in the bit vector (copied CL). For a promoted cache line (copied CL bit has been set to 1), the PLB 710A will direct its corresponding evicted cache line from CPU cache to the primary memory medium 720A (e.g., DRAM) as the PLB 710A has indicated this cache line has been promoted. For a cache line that has been evicted out from CPU cache but not promoted from secondary memory medium 740A (e.g., SSD) yet, PLB 710A will direct the cache line to the primary memory medium 720A (e.g., DRAM) and set the copied CL bit as 1. After that, if the corresponding cache line is later promoted from secondary memory medium 740A (e.g., SSD), the promoted cache line will be dropped because the latest update (in the CPU cache) has been placed in the primary memory medium 720A (e.g., DRAM).

Adaptive Page Promotion Scheme

Returning now again to FIG. 5, the FlatFlash system 500 may also provide for identifying pages for promotion within the SSD-Cache 542. The SSD-Cache 542 in the FlatFlash system 500 may use a set-associative cache structure and leverages Re-reference Interval Prediction (RRIP) as its replacement policy since it can achieve a better cache hit rate, especially for random page accesses. Each entry in SSD cache 542 may have a valid bit (V), tag (Tag), re-reference interval value counter (RRPV), page hit counter (pageCnt), and page data (Page). The pageCnt increments when a cache line of a corresponding page is accessed. A naive approach, taken from the paging mechanism of the current state of art such as, for example, computer system 425 of FIG. 4, promotes every accessed page. This can pollute the primary memory medium (e.g., DRAM) as many of these pages have low reuse. To manage page promotions, an access counter can be added for each page in the SSD cache 542 page hit counter (pageCnt), whose value is compared against a predefined threshold (e.g., a maximum threshold "maxThreshold"), on every access to determine if it should be promoted or not. However, comparison against a fixed threshold is insufficient to dynamically adapt to different memory access patterns.

Thus an adaptive threshold ("CurrThreshold") is needed so that pages are promoted frequently when there is high page-reuse and infrequently when there is low page-reuse. To detect page re-use pattern, the FlatFlash system 500 may set a current ratio ("current ratio") to equation 1, $$\text{current ratio} = \frac{AggPromotedCnt}{AccessCnt}, \qquad (1)$$

where "AggPromotedCnt" is the sum of the page access counters that have reached a current threshold ("CurrThreshold" and illustrated in the below pseudocode) and "AccessCnt" is the total number of accesses to the SSD cache 542. A high value of currRatio signifies high page-reuse as many pages' access counters reached the current threshold ("CurrThreshold") value and were promoted. Similarly, a low value of currRatio signifies low page-reuse as not many pages' access counters reached the current threshold ("CurrThreshold").

The adaptive promotion operation adapts the current threshold ("CurrThreshold") value based on whether the currRatio is high "HiRatio" or low ("LwRatio"). If currRatio is greater than or equal to "HiRatio," then current threshold ("CurrThreshold") may be decremented so that the pages are promoted frequently. If the currRatio is less than or equal to "LwRatio," then current threshold ("CurrThreshold") is incremented so that the pages are promoted infrequently.

To mitigate the slow unlearning rate of the adaptive promotion operation, the FlatFlash system 500 may reset the CurrThreshold, AggPromotedCnt, and AccessCnt counters at every epoch (e.g., period of time), ResetEpoch. To preserve the access pattern for the pages currently in the SSD cache 542, the FlatFlash system 500 may set AccessCnt to NetAggCnt, which is the sum of the pageCnt for all pages present in the SSD cache 542 thereby avoiding the overhead of scanning the PageCntArraym, which has 512K (thousand) entries for a 2 GB ("gigabyte") SSD cache 542. The storage overhead of the page promotion mechanism may be 0.2% of the SSD cache 542 size, mostly contributed by the PageCntArray. The adaptive promotion operation ("adaptive promotion operation 1") may be depicted in the following pseudocode:

To implement this feature, the FlatFlash system 500 leverages the existing PCIe-based atomic memory operations. As many modern secondary memory medium 540 (e.g., an SSD) employ battery-backed primary memory medium 520 (e.g., DRAM) or large capacitors in their controllers, the received memory write requests via PCIe MMIO will be persistent without much hardware modifications.

The FlatFlash system may employ battery-backed primary memory medium 520 (e.g., DRAM) inside the secondary memory medium 540 (e.g., an SSD) to simplify its implementation for data persistence. It allows applications to create a dedicated persistent memory region with the provided function: "create_pmem_region (void*vaddr, size_t size)". All of the virtual addresses in the persistent memory region may be mapped to the address space of the secondary memory medium 540 (e.g., an SSD).

However, ensuring data persistence is challenging because (1) the update to the persistent memory region could be cached in processor cache and (2) a page in the secondary memory medium 540 (e.g., an SSD) could be promoted to the volatile primary memory medium 520 (e.g., DRAM) in the host. To overcome the first challenge, the FlatFlash

```
    Variables: PageCntArray({0}), NetAggCnt(0), AccessCnt(0), AggPromotedCnt(0),
LwRatio(0.25), HiRatio(0.75), MaxThreshold(7), ResetEpoch(10K), CurrThreshold(7);
 1:    procedure ADJUST_CNT(set,way)
 2:        NetAggCnt ← NetAggCnt − PageCntArray[set][way]
 3:        PageCntArray[set][way] ← 0
 4:    procedure UPDATE(pageSet,pageWay)
 5:        NetAggCnt++
 6:        AccessCnt++
 7:        pageCnt ← ++PageCntArray[pageSet][pageWay]
 8:        promoteFlag ← pageCnt = CurrThreshold
 9:        if promoteFlag then
10:            AggPromotedCnt ← AggPromotedCnt + pageCnt
11:            PROMOTE(pageSet, pageWay)
12:        currRatio ← AggPromotedCnt / AccessCnt
13:        if currRatio ≤ LwRatio then
14:            if CurrThreshold < MaxThreshold then
15:                CurrThreshold++
16:        else if currRatio ≥ HiRatio then
17:            if CurrThreshold > 1 and promoteFlag then
18:                CurrThreshold−−
19:        if AccessCnt = ResetEpoch then . reset counters
20:            AccessCnt ← NetAggCnt
21:            AggPromotedCnt ← 0
'22:           CurrThreshold ← maxThreshold
```

Byte-Granular Data Persistence

As discussed, a unified memory interface of the unified memory system 530 may be used to simplify the programmability with byte-addressable large secondary memory medium 540 (e.g., an SSD). The secondary memory medium 540 (e.g., an SSD) and programs can transparently obtain the performance benefits from both byte-addressable large secondary memory medium 540 (e.g., an SSD) and fast primary memory medium 520 (e.g., DRAM). As a new interface enabled in secondary memory medium 540 (e.g., an SSD), the byte-accessibility also helps programs achieve fine-grained data persistence by exploiting the byte-granular durable write in combination with the persistence nature of secondary memory medium 540 (e.g., an SSD). Unlike conventional persistent storage that uses a block interface, the FlatFlash system 500 enables byte-granular data persistence, which significantly reduces the I/O traffic to secondary memory medium 540 (e.g., an SSD). This feature can be used to achieve byte-granular data persistence for specific data structures in software systems, such as log persistence in database and meta-data persistence in file systems.

system 500 enforces applications to flush the corresponding cache lines when they write to the persistent memory region and employs the "write-verify read" approach, which functions similarly to memory fence ("mfence") to enforce the ordering of writes and cache flushing in host bridge 512.

To overcome the second challenge, the FlatFlash system 500 leverages one of the reserved bits in the PTE as the Persist (P) bit to indicate whether a page should be promoted or not. For every memory access to the secondary memory medium 540 (e.g., an SSD), during address translation, the physical address is prefixed with the P bit, and this new physical address is transferred to the host bridge 512. When the host bridge 512 detects a memory request for the secondary memory medium 540 (e.g., an SSD), it creates a PCIe packet. In this packet, the address field is set to the memory address with the "P" bit masked out, and the attribute field is set to the value of the P bit. When the secondary memory medium 540 (e.g., an SSD) receives a packet with the P bit set, the secondary memory medium 540 (e.g., an SSD) will not execute the "UPDATE" operation in adaptive promotion operation 1 (see pseudocode above) to avoid the promotion of these pages.

FlatFlash Memory Implementation

In one aspect, the FlatFlash system 500 may use a unified address translation layer in the memory manager 532, where all of the indirection layers of the memory mapping of the secondary memory medium 540 (e.g., an SSD) have been combined into a single layer. The FlatFlash system 500 may use the memory-mapped interface to create a unified memory address space while providing direct access to any data that is mapped to the secondary memory medium 540 (e.g., an SSD) in cache line granularity. Since the FTL of the secondary memory medium 540 (e.g., an SSD) is integrated into the page table (see page table 610B of FIG. 6 or page table in PLB 710A of FIG. 7) in the virtual memory system in the primary memory medium 520 (e.g., DRAM), the FlatFlash system 500 allows the secondary memory medium 540 (e.g., an SSD controller of the SSD) to update the address mapping in PTEs and TLB entries for memory-mapped regions when garbage collection (GC) of the SSD moves pages to new flash blocks.

To avoid frequent TLB shootdown, FlatFlash maintains a mapping table in the secondary memory medium 540 (e.g., an SSD) that maps the old physical address to the new physical address. Thus, it can serve memory requests from the host machine using the old physical address, and the entries in the mapping table will be lazily propagated to the page table entries and TLB entries in batches using a single interrupt.

Figure 8:
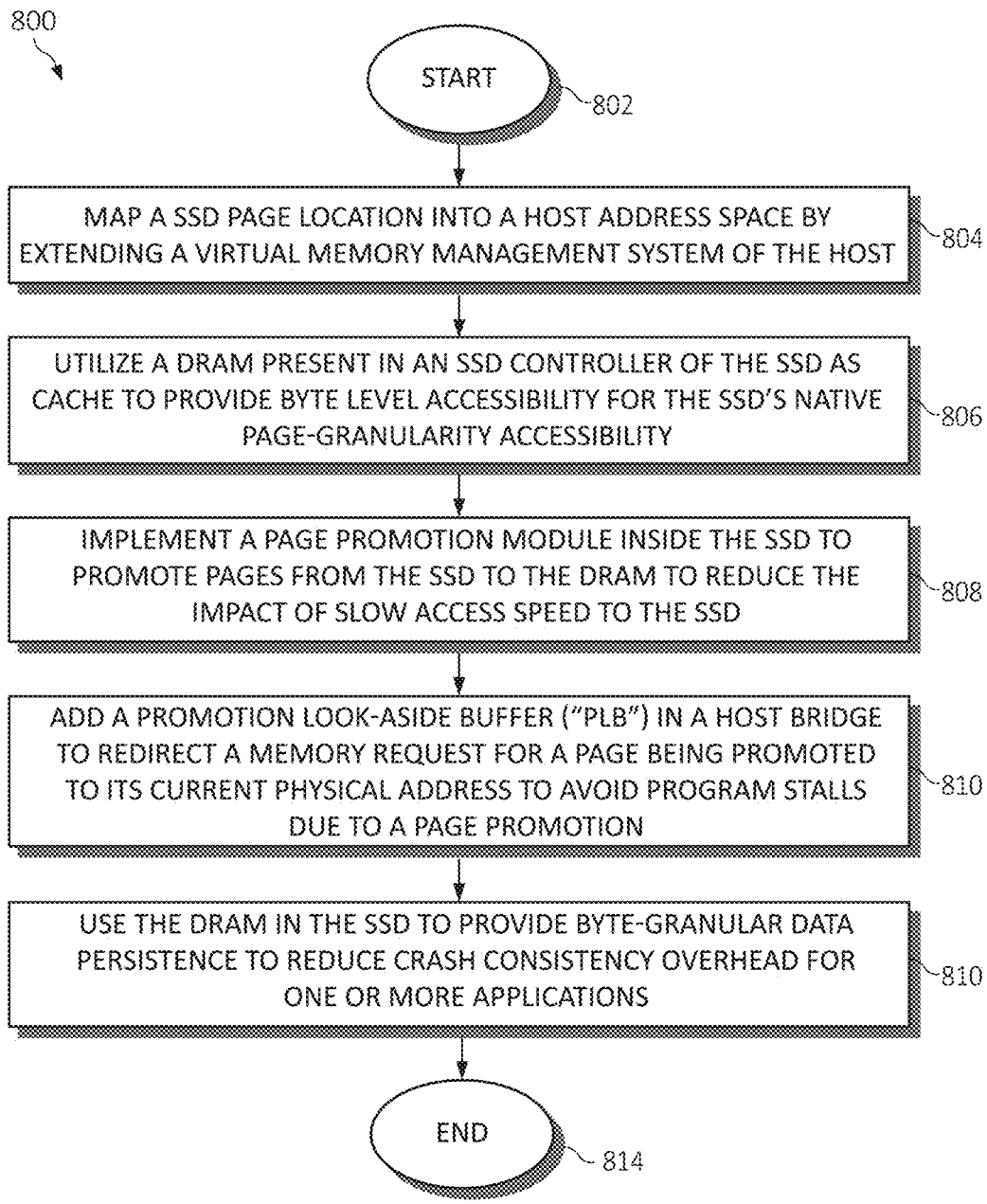
FIG. 8 is a flowchart diagram depicting an exemplary method for providing byte granularity accessibility of memory in a unified memory-storage hierarchy in a computing system in which aspects of the present invention may be realized.

Turning now to FIG. 8, a method 800 for providing byte granularity accessibility of memory in a unified memory-storage hierarchy in a computing environment is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802.

An SSD page location of a page in an SSD may be mapped into an address space of a host primary memory (e.g., DRAM) by extending a virtual memory management system (e.g., a unified memory-storage hierarchy) of the host system; as in block 804. The DRAM present in an SSD controller of the SSD may be utilized as cache to provide byte level accessibility for the SSD's native page-granularity accessibility, as in block 806. A page promotion module/component (e.g., a lightweight, adaptive and transparent page promotion module) may be implemented (in the SSD controller of FIG. 5) inside the SSD to promote pages from the SSD to the DRAM to reduce the impact of slow access speed to the SSD, as in block 808. In one aspect, "lightweight" may refer to low performance overhead, "adaptive" may refer to the ability to promote pages according to different workload patterns, and "transparent" may refer to being transparent to upper-level applications and software. A promotion look-aside buffer ("PLB") may be implemented in a host bridge to redirect a memory request for a page being promoted to its current physical address to avoid program stalls due to a page promotion, as in block 810. The DRAM in the SSD may be used to provide byte-granular data persistence to reduce crash consistency overhead for one or more applications, as in block 812. The functionality 800 may end in block 814.

Figure 9:
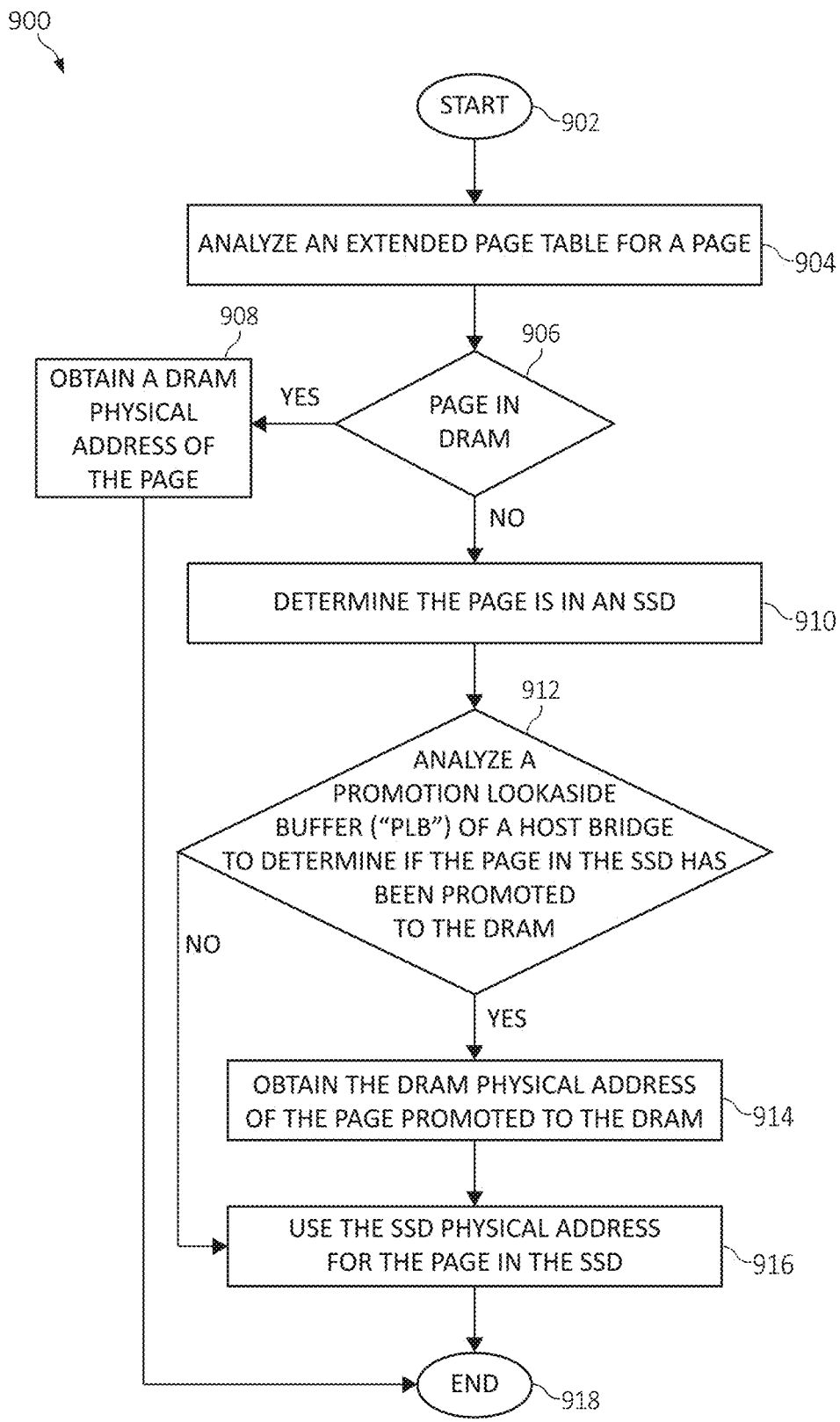
FIG. 9 is a flowchart diagram depicting an exemplary method for providing transitioning a virtual address to a physical address in a unified memory-storage hierarchy in a computing system in which aspects of the present invention may be realized.

FIG. 9 is an exemplary method 900 for providing transitioning a virtual address to a physical address in a unified memory-storage hierarchy. The functionality 900 may be implemented as a method executed as instructions on a machine, where the instructions are included on at least one computer readable medium or on a non-transitory machine-readable storage medium. The functionality 900 may start in block 902.

For a central processing unit ("CPU") having a virtual address, an extended page table for a page may be analyzed, as in block 904. A determination operation may be performed to determine if the page is located in DRAM (or in an SSD), as in block 906. If the page is located in DRAM, a DRAM physical address of the page may be obtained, as in block 908. The method 900 may move to block 918. If the page is not located in DRAM, a determination operation is performed to determine the page is in the SSD, as in block 910. A promotion lookaside buffer ("PLB") of a host Bridge may be analyzed and checked to determine if the page in the SSD has been promoted to the DRAM, as in block 912.

If the page in the SSD has been promoted to the DRAM, the DRAM physical address of the page promoted to the DRAM may be obtained, as in block 914. If the page in the SSD has not been promoted to the DRAM, the SSD physical address for the page in the SSD may be used, as in block 916. The functionality 900 may end in block 918.

Figure 10:
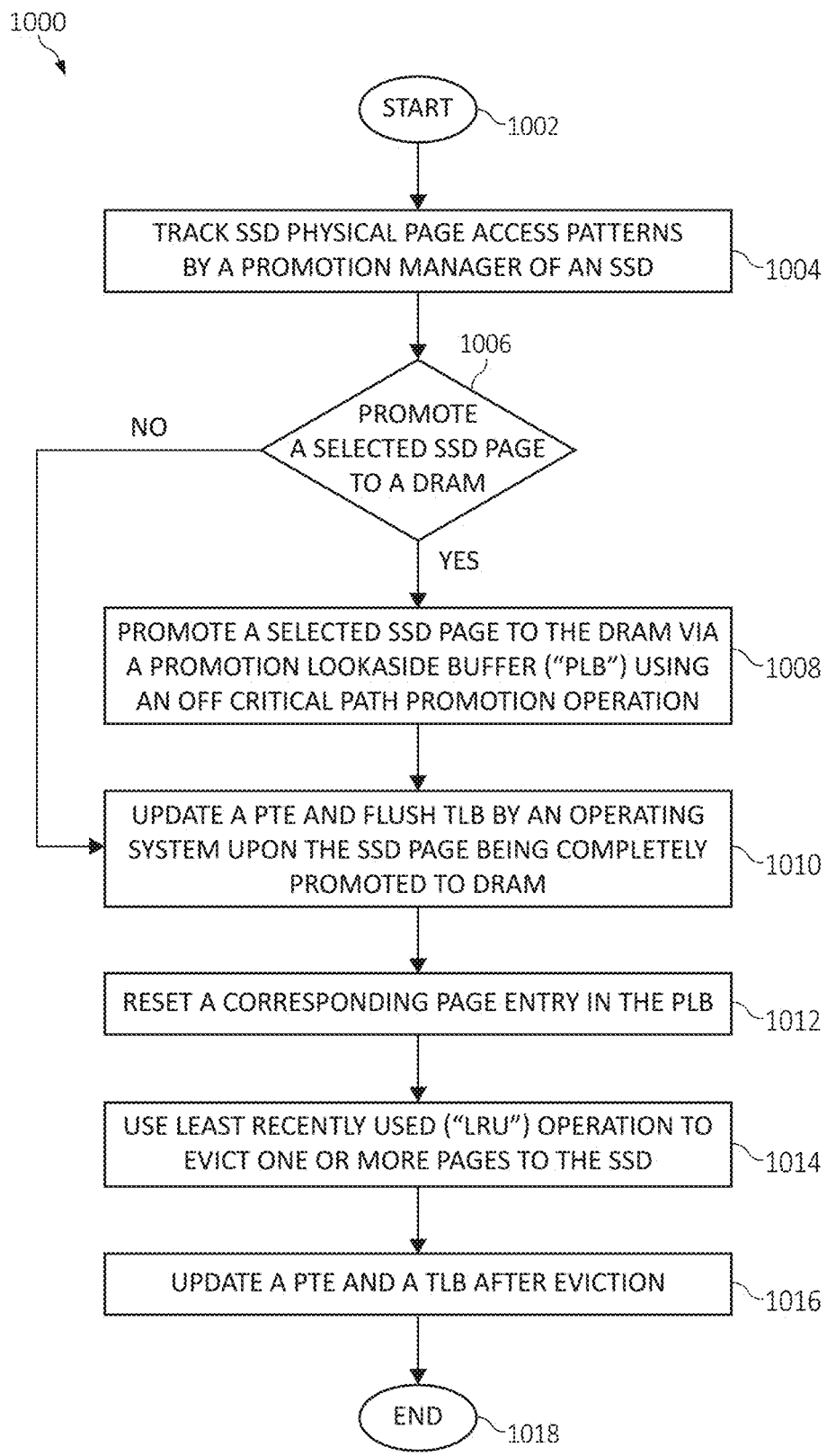
FIG. 10 is a flowchart diagram depicting an exemplary method for performing page promotion in a unified memory-storage hierarchy in a computing environment in a computing system in which aspects of the present invention may be realized.

Turning now to FIG. 10, a method 1000 for performing page promotion in a unified memory-storage hierarchy in a computing environment in a computing system is depicted, in which various aspects of the illustrated embodiments may be implemented. The functionality 1000 may be implemented as a method executed as instructions on a machine, where the instructions are included on at least one computer readable medium or on a non-transitory machine-readable storage medium. The functionality 1000 may start in block 1002.

SSD physical page access patterns may be tracked by a promotion manager of an SSD, as in block 1004. A determination operation may be performed to determine whether to promote a selected SSD page to a DRAM, as in block 1006. That is, the SSD promotion manager tracks SSD physical page access patterns and determines if a page should be promoted to DRAM (e.g., track hot pages being frequently accessed).

If a selected SSD page is to be promoted to a DRAM, the selected SSD page may be promoted to the DRAM via a promotion lookaside buffer ("PLB") using an off critical path promotion operation, as in block 1008. A page table entry (PTE) and flush Translation Lookaside Buffer (TLB) may be updated by an operating system upon the SSD page being completely promoted to DRAM, as in block 1010. A corresponding page entry in the PLB may be reset, as in block 1012. A least recently used ("LRU") operation may be used to evict one or more pages to the SSD, as in block 1014. The PTE and the TLB may be updated after eviction, as in block 1016. The functionality 1000 may end in block 1018.

Figure 11:
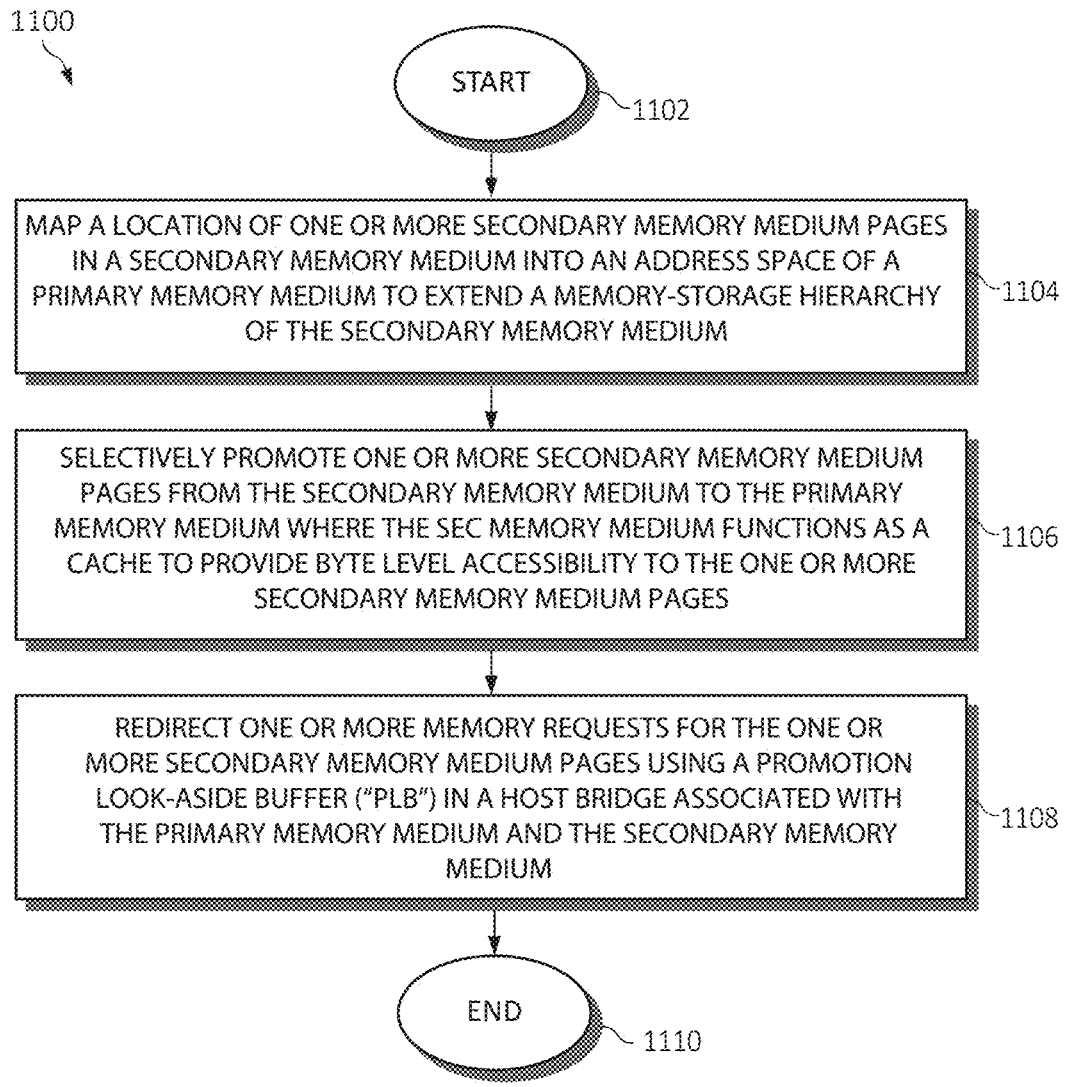
FIG. 11 is a flowchart diagram depicting an exemplary method for providing byte granularity accessibility of memory in a unified memory-storage hierarchy in a computing environment in a computing system in which aspects of the present invention may be realized.

Turning now to FIG. 11, a method 1100 for providing byte granularity accessibility of memory in a unified memory-storage hierarchy in a computing environment in a computing system is depicted, in which various aspects of the illustrated embodiments may be implemented. The functionality 1100 may be implemented as a method executed as instructions on a machine, where the instructions are included on at least one computer readable medium or on a non-transitory machine-readable storage medium. The functionality 1100 may start in block 1102.

A location of one or more secondary memory medium pages in a secondary memory medium may be mapped into an address space of a primary memory medium to extend a memory-storage hierarchy of the secondary memory medium, as in block 1104. The one or more secondary memory medium pages may be promoted from the secondary memory medium to the primary memory medium where the primary memory medium functions as a cache to provide byte level accessibility to the one or more primary memory medium pages, as in block 1106. A memory request for the secondary memory medium page may be redirected using a promotion look-aside buffer ("PLB") in a host bridge associated with the primary memory medium and the secondary memory medium, as in block 1108. The functionality 1100 may end in block 1110.

In one aspect, in conjunction with and/or as part of at least one block of FIG. 11, the operation of method 1100 may include each of the following. The operation of functionality 1100 may implement a page promotion policy in the primary memory medium to migrate one or more frequently used primary memory medium pages and the primary memory medium is a solid state drive (SSD) memory and the secondary memory medium is a dynamic random access memory (DRAM). The operation of functionality 1100 may initiate a page promotion operation to promote the one or more primary memory medium pages from the primary memory medium to the secondary memory medium.

The operation of functionality 1100 may initiate the PLB in the host bridge to redirect the one or more memory requests for the one or more secondary memory medium pages being promoted to a current location address in the one or more secondary memory medium. The operation of functionality 1100 may selectively promote one or more hot primary memory medium pages from the primary memory medium to the secondary memory medium while retaining one or more cold memory medium pages in the primary memory medium.

The operation of functionality 1100 may insert an entry into a PLB table associated with the PLB for each of the one or more primary memory medium pages selectively promoted, and/or evict the one or more primary memory medium pages from the secondary memory medium according to a least recently used (LRU) operation.

Figure 12:
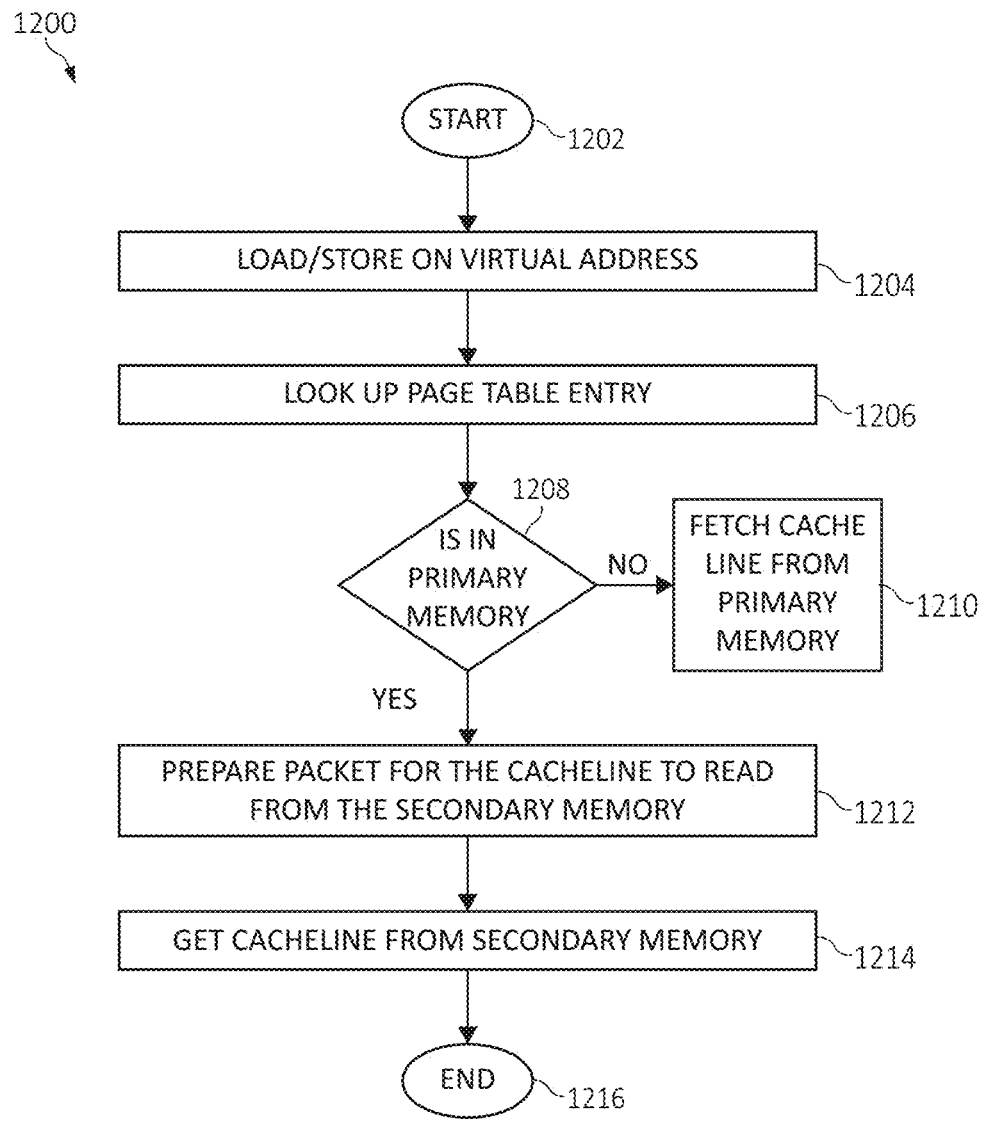
FIG. 12 is a flowchart diagram depicting an exemplary method for providing byte granularity accessibility of memory in a unified memory-storage hierarchy in which aspects of the present invention may be realized.

Turning now to FIG. 12, an additional method 1200 for providing byte granularity accessibility of memory in a unified memory-storage hierarchy in a computing environment is depicted, in which various aspects of the illustrated embodiments may be implemented. The functionality 1200 may be implemented as a method executed as instructions on a machine, where the instructions are included on at least one computer readable medium or on a non-transitory machine-readable storage medium. The functionality 1200 may start in block 1202.

A memory page may be loaded with a virtual address, as in block 1204. A page table entry may be identified (e.g., look up) using a look up operation in a page table, as in block 1206. A determination operation may be performed to determine if the memory page is located in a primary memory, as in block 1208. If yes, a cache line from the primary memory may be fetched/obtained, as in block 1210. If the memory page is not located in a primary memory (e.g., "no" from block 1208), a packet for a cache line may be prepared to read the memory page from a secondary memory, as in block 1212. The cache line may be obtained (e.g., "get") from the secondary memory, as in block 1214. The functionality 1200 may end in block 1216.

Figure 13:
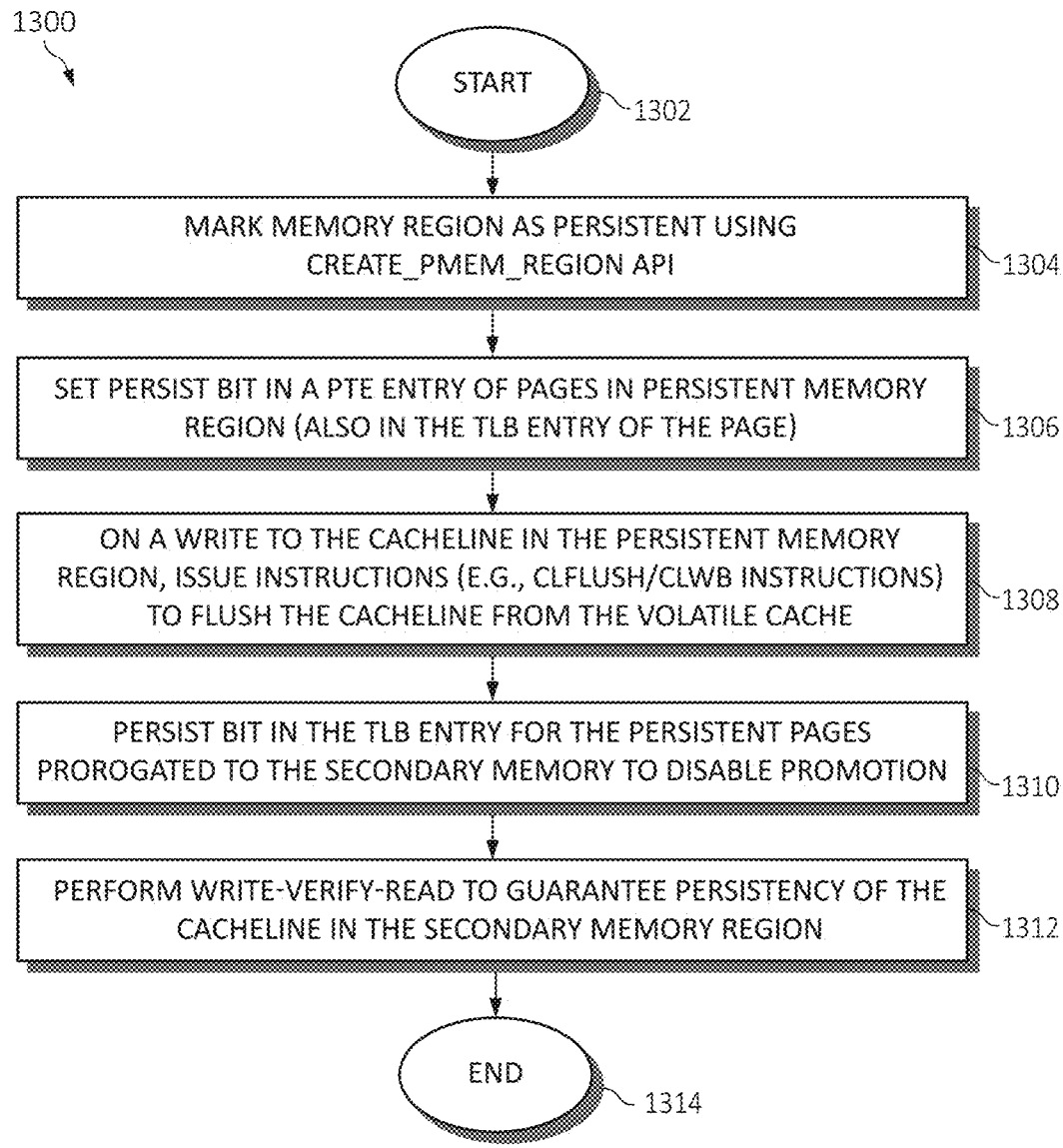
FIG. 13 is a flowchart diagram depicting an exemplary method for performing data persistence in a computing environment in which aspects of the present invention may be realized.

Turning now to FIG. 13, an additional method 1300 for performing data persistence (e.g., "persistency") in a computing environment is depicted, in which various aspects of the illustrated embodiments may be implemented. The functionality 1300 may be implemented as a method executed as instructions on a machine, where the instructions are included on at least one computer readable medium or on a non-transitory machine-readable storage medium. The functionality 1300 may start in block 1302.

A region in memory may be marked as persistent, (which may be performed by a user using create_pmem_region application programming interface "API"), as in block 1304. A persist bit may be set in a PTE entry of pages in a persistent memory region (and/or also in a TLB entry of a page), as in block 1306. On a write operation to a cache line in the persistent memory region, one or more instructions (e.g., processor instructions used to flush processor cache lines) may be issued to flush the cache line from a volatile cache, as in block 1308. The persist bit in the TLB entry for the persistent pages may be propagated to a secondary memory to disable promotion, as in block 1310. A write-verify-read operation may be performed to guarantee persistency of the cache line in the secondary memory region, as in block 1312. The functionality 1300 may end in block 1314.

Figure 14:
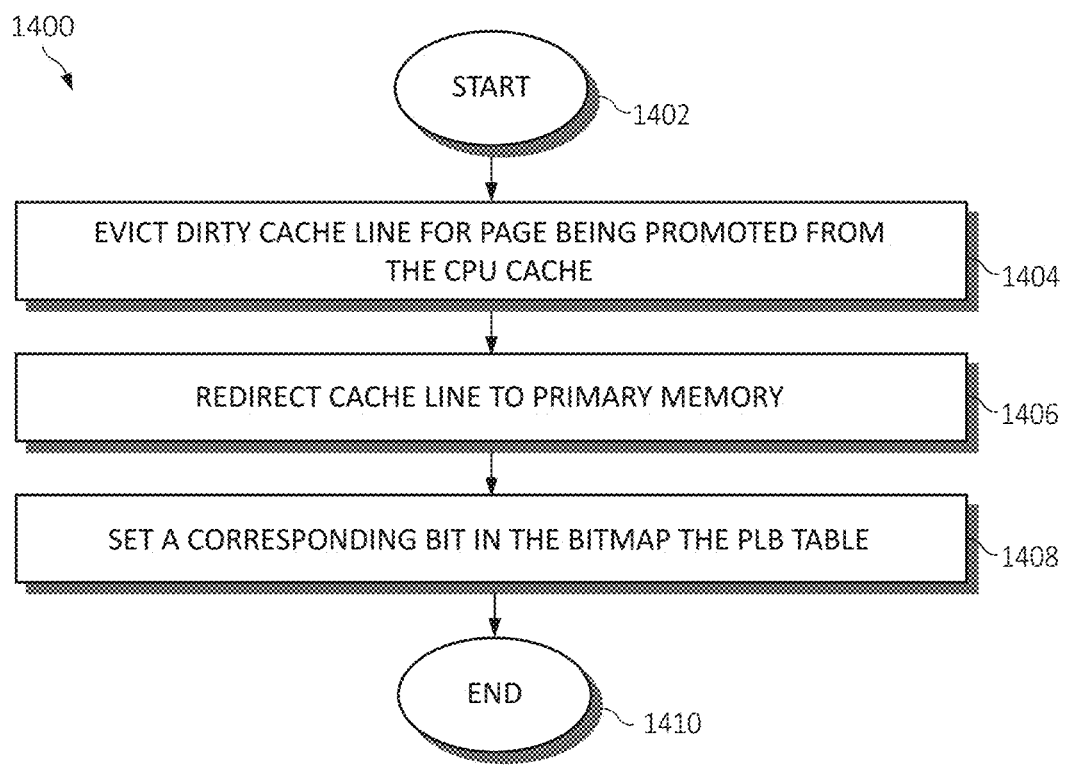
FIG. 14 is a flowchart diagram depicting an exemplary method for performing a promotion look-aside interaction operation with dirty cache line eviction in a computing environment in which aspects of the present invention may be realized.

Turning now to FIG. 14, an additional method 1400 for performing a promotion look-aside interaction operation with dirty cache line eviction in a computing environment is depicted, in which various aspects of the illustrated embodiments may be implemented. The functionality 1400 may be implemented as a method executed as instructions on a machine, where the instructions are included on at least one computer readable medium or on a non-transitory machine-readable storage medium. The functionality 1400 may start in block 1402.

A dirty cache line for a page being promoted may be evicted from a CPU cache, as in block 1404. The cache line may be redirected to primary memory, as in block 1406. A corresponding bit in a bitmap may be set in a PLB table, as in block 1408. The functionality 1400 may end in block 1410.

Figure 15:
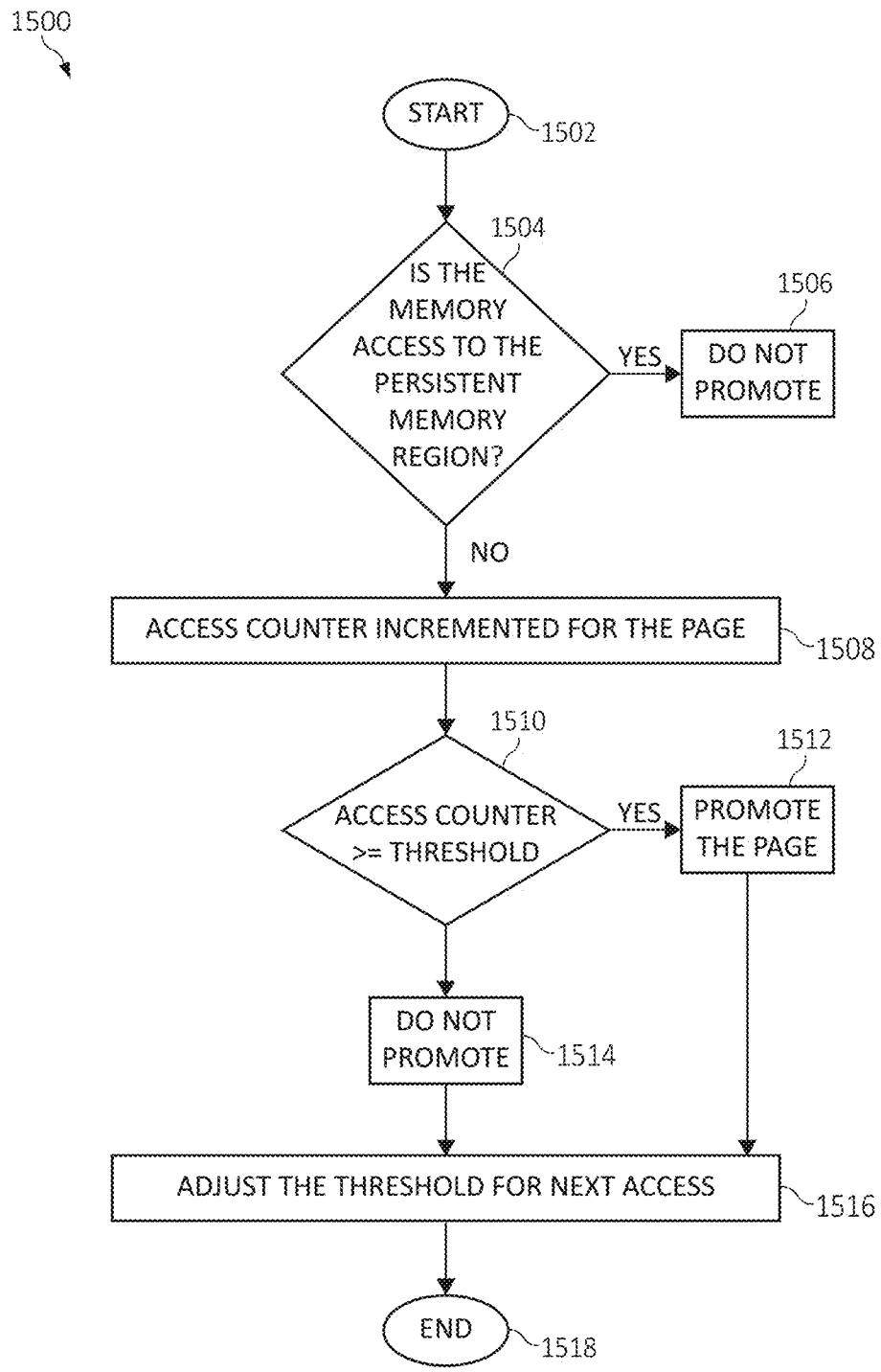
FIG. 15 is a flowchart diagram depicting an exemplary method for promoting a memory page in a computing environment in which aspects of the present invention may be realized.

Turning now to FIG. 15, an additional method 1500 for promoting a memory page in a computing environment is depicted, in which various aspects of the illustrated embodiments may be implemented. The functionality 1500 may be implemented as a method executed as instructions on a machine, where the instructions are included on at least one computer readable medium or on a non-transitory machine-readable storage medium. The functionality 1500 may start in block 1502.

A determination operation may be performed to determine if memory write is to a persistent memory region, as in block 1504. If yes, a memory page is not promoted (e.g., do not promote), as in block 1506. If no at block 1504, a memory access counter may be incremented for the memory page, as in block 1508. A determination operation may be performed to determine if the memory access counter is greater than and/or equal to a threshold (e.g., a selected threshold value), as in block 1510. If yes, the memory page may be promoted, as in block 1512. If no at block 1510, the memory page may not be promoted (e.g., do not promote), as in block 1514. From blocks 1512 and 1514, the threshold may be adjusted for a next/subsequent access, as in block 1516. The functionality 1500 may end in block 1518.

Figure 16:
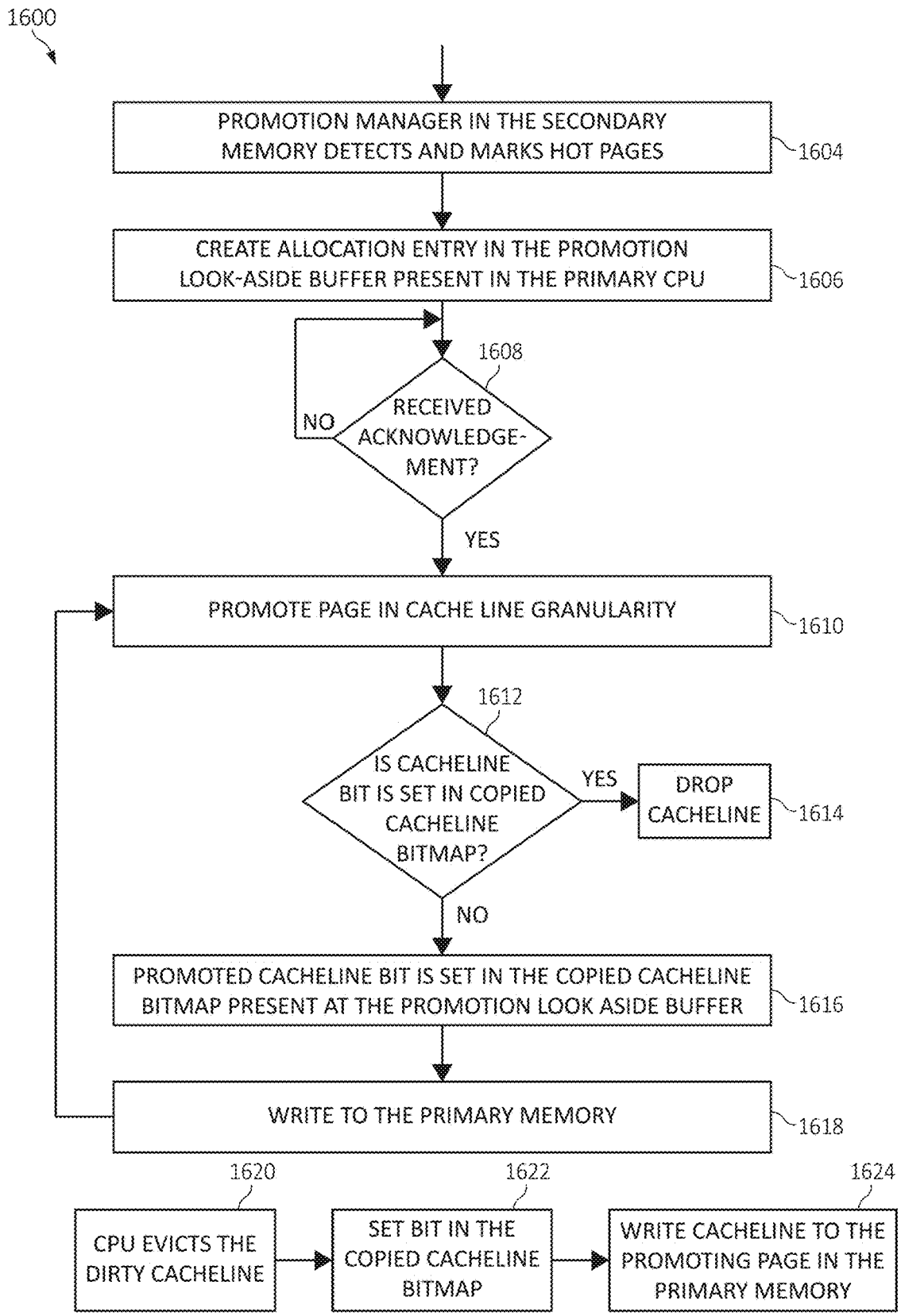
FIG. 16 is a flowchart diagram depicting an exemplary method for using a promotion look-aside buffer in a computing environment again, in which aspects of the present invention may be realized.

Turning now to FIG. 16, an additional method 1600 for using a promotion look-aside buffer in a computing environment is depicted, in which various aspects of the illustrated embodiments may be implemented. The functionality 1600 may be implemented as a method executed as instructions on a machine, where the instructions are included on at least one computer readable medium or on a non-transitory machine-readable storage medium.

The functionality 1600 may start with memory page being detected and marked as a hot memory page (e.g., hot page) by a promotion manager in a secondary memory, as in block 1604. An allocation entry may be created in a promotion look-aside buffer present in a primary CPU, as in block 1606. A determination operation may be performed to determine if an acknowledgment ("ack") may be received, as in block 1608. If no, the method returns back to block 1608. If yes, a memory page in a cache line granularity may be promoted, as in block 1610. A determination operation may be performed to determine if a cache line bit is set in a copied cache line bitmap, as in block 1612. If yes, the cache line may be dropped/deleted (e.g., dropped from the promotion procedure and not use it to update the hose primary memory (e.g., DRAM) since the cache line holds stale data), as in block 1614. If yes, a promoted cache line bit may be set in the copied cache line bitmap present at the promotion look-aside buffer, as in block 1616. The memory page may be written to the primary memory, as in block 1618.

In parallel with operations of blocks 1604 through 1618, and/or subsequent to block 1618, a CPU may evict a dirty cache line (e.g., dirty cache line is evicted from processor cache), as in block 1620. A bit in the copied cache line bitmap may be set, as in block 1622. A cache line may be written to the promoting memory page in the primary memory, as in block 1624. The functionality 1600 may end.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing byte granularity accessibility of memory in a unified memory-storage hierarchy in a computing environment, comprising:
   mapping a location of one or more secondary memory medium pages in a secondary memory medium into an address space of a primary memory medium to extend a memory-storage hierarchy of the secondary memory medium, wherein the primary memory medium and the secondary memory medium are arranged into a unified and flat memory space comprising the address space;
   selectively promoting, according to application data access patterns, one or more secondary memory medium pages from the secondary memory medium to the primary memory medium, wherein the primary memory medium functions as a cache to provide byte level accessibility to the one or more secondary memory medium pages; and
   redirecting one or more memory requests for the one or more secondary memory medium pages using a promotion look-aside buffer ("PLB") in a host bridge associated with the primary memory medium and the secondary memory medium.

2. The method of claim 1, further including implementing a page promotion policy in the secondary memory medium to migrate one or more frequently used secondary memory medium pages, wherein the secondary memory medium is a solid state drive (SSD) memory and the primary memory medium is a dynamic random access memory (DRAM).

3. The method of claim 1, further including initiating a page promotion operation to promote the one or more primary memory medium pages from the secondary memory medium to the primary memory medium.

4. The method of claim 1, further including initiating the PLB in the host bridge to redirect the one or more memory requests for the one or more secondary memory medium pages being promoted to a current location address in the one or more primary memory medium.

5. The method of claim 1, further including selectively promoting one or more hot secondary memory medium pages from the secondary memory medium to the primary memory medium while retaining one or more cold secondary memory medium pages in the primary memory medium.

6. The method of claim 1, further including inserting an entry into a PLB table associated with the PLB for each of the one or more secondary memory medium pages selectively promoted.

7. The method of claim 1, further including evicting the one or more primary memory medium pages from the primary memory medium according to a least recently used (LRU) operation.

8. A system for providing byte granularity accessibility of memory in a unified memory-storage hierarchy in a computing environment, comprising:
   one or more computers with executable instructions that when executed cause the system to:
      map a location of one or more secondary memory medium pages in a secondary memory medium into an address space of a primary memory medium to extend a memory-storage hierarchy of the secondary memory medium, wherein the primary memory medium and the secondary memory medium are arranged into a unified and flat memory space comprising the address space;
      selectively promote, according to application data access patterns, one or more secondary memory medium pages from the secondary memory medium to the primary memory medium, wherein the primary memory medium functions as a cache to provide byte level accessibility to the one or more secondary memory medium pages; and
      redirect one or more memory requests for the one or more secondary memory medium pages using a promotion look-aside buffer ("PLB") in a host bridge associated with the primary memory medium and the secondary memory medium.

9. The system of claim 8, wherein the executable instructions implement a page promotion policy in the secondary memory medium to migrate one or more frequently used secondary memory medium pages, wherein the secondary memory medium is a solid state drive (SSD) memory and the primary memory medium is a dynamic random access memory (DRAM).

10. The system of claim 8, wherein the executable instructions initiate a page promotion operation to promote the one or more primary memory medium pages from the secondary memory medium to the primary memory medium.

11. The system of claim 8, wherein the executable instructions initiate the PLB in the host bridge to redirect the one or more memory requests for the one or more secondary memory medium pages being promoted to a current location address in the one or more primary memory medium.

12. The system of claim 8, wherein the executable instructions selectively promote one or more hot secondary memory medium pages from the secondary memory medium to the primary memory medium while retaining one or more cold secondary memory medium pages in the primary memory medium.

13. The system of claim 8, wherein the executable instructions insert an entry into a PLB table associated with the PLB for each of the one or more secondary memory medium pages selectively promoted.

14. The system of claim 8, wherein the executable instructions evict the one or more primary memory medium pages from the primary memory medium according to a least recently used (LRU) operation.

15. A computer program product for providing byte granularity accessibility of memory in a unified memory-storage hierarchy in a computing environment by a processor, the computer program product comprising a non-transitory computer-readable storage medium having computer-readable program code portions stored therein, the computer-readable program code portions comprising:

an executable portion that maps a location of one or more secondary memory medium pages in a secondary memory medium into an address space of a primary memory medium to extend a memory-storage hierarchy of the secondary memory medium, wherein the primary memory medium and the secondary memory medium are arranged into a unified and flat memory space comprising the address space;

an executable portion that selectively promotes, according to application data access patterns, one or more secondary memory medium pages from the secondary memory medium to the primary memory medium, wherein the primary memory medium functions as a cache to provide byte level accessibility to the one or more secondary memory medium pages; and an executable portion that redirects one or more memory requests for the one or more secondary memory medium pages using a promotion look-aside buffer ("PLB") in a host bridge associated with the primary memory medium and the secondary memory medium.

16. The computer program product of claim 15, further including an executable portion that implements a page promotion policy in the secondary memory medium to migrate one or more frequently used secondary memory medium pages, wherein the secondary memory medium is a solid state drive (SSD) memory and the primary memory medium is a dynamic random access memory (DRAM).

17. The computer program product of claim 15, further including an executable portion that a page promotion operation to promote the one or more primary memory medium pages from the secondary memory medium to the primary memory medium.

18. The computer program product of claim 15, further including an executable portion that initiates the PLB in the host bridge to redirect the one or more memory requests for the one or more secondary memory medium pages being promoted to a current location address in the one or more primary memory medium.

19. The computer program product of claim 15, further including an executable portion that selectively promotes one or more hot secondary memory medium pages from the secondary memory medium to the primary memory medium while retaining one or more cold secondary memory medium pages in the primary memory medium.

20. The computer program product of claim 15, further including an executable portion that:
  inserts an entry into a PLB table associated with the PLB for each of the one or more primary memory medium pages selectively promoted; or
  evicts the one or more primary memory medium pages from the primary memory medium according to a least recently used (LRU) operation.

* * * * *